US012625747B2

(12) United States Patent
Pang et al.

(10) Patent No.: US 12,625,747 B2
(45) Date of Patent: May 12, 2026

(54) DISPLAY APPARATUS COMPRISING DRIVE CIRCUIT AND DRIVE CHIP CONFIGURED TO DRIVE LIGHT BEAD IN LIGHT BOARD

(71) Applicant: HISENSE VISUAL TECHNOLOGY CO., LTD., Qingdao (CN)

(72) Inventors: Zhenhua Pang, Qingdao (CN); Suying Wang, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 65 days.

(21) Appl. No.: 18/745,096

(22) Filed: Jun. 17, 2024

(65) Prior Publication Data

US 2024/0339070 A1 Oct. 10, 2024

Related U.S. Application Data

(63) Continuation of application No. PCT/CN2023/143672, filed on Dec. 29, 2023.

(30) Foreign Application Priority Data

Mar. 21, 2023 (CN) .......................... 202310280055.1
Apr. 28, 2023 (CN) .......................... 202310485739.5
(Continued)

(51) Int. Cl.
*G06F 9/54* (2006.01)
*G09G 3/20* (2006.01)
(Continued)

(52) U.S. Cl.
CPC ............. *G06F 9/54* (2013.01); *G09G 3/2096* (2013.01); *G09G 3/32* (2013.01); *G09G 3/3426* (2013.01);
(Continued)

(58) Field of Classification Search
CPC .......... G06F 9/54; G09G 3/2096; G09G 3/32; G09G 3/3426; G09G 3/3648; G09G 2310/0202; G09G 2330/02
See application file for complete search history.

(56) References Cited

U.S. PATENT DOCUMENTS 5,767,818 A * 6/1998 Nishida .................... G09G 3/24
345/55
7,986,282 B2 * 7/2011 Zerphy ................. G06F 3/1446
345/1.3
(Continued)

FOREIGN PATENT DOCUMENTS

CN 201491346 U 5/2010
CN 101252659 B 8/2010
(Continued)

OTHER PUBLICATIONS

State Intellectual Property Office of China Notice of Grant of Invention Patent Right for Application No. 202310545206.1 Apr. 19, 2024 6 pages (including translation).
(Continued)

*Primary Examiner* — Nathan P Brittingham
(74) *Attorney, Agent, or Firm* — ANOVA LAW GROUP, PLLC

(57) ABSTRACT

The present application provides a drive chip, a drive circuit, a display apparatus, and a data communication method; where preset marking information of the drive chip can be set in the drive chip; the drive chip can be connected to at least one controller and at least one light bead; the at least one controller can be configured to send drive data to the drive chip based on the preset marking information of the drive chip, where the preset marking information can include an address of the drive chip; the drive chip can be electrically connected to the at least one light bead and can (Continued)

be configured to drive the at least one light bead according to the drive data.

19 Claims, 18 Drawing Sheets

(30) Foreign Application Priority Data

| | | |
|---|---|---|
| Apr. 28, 2023 | (CN) .......................... | 202310485752.2 |
| May 11, 2023 | (CN) .......................... | 202310532469.9 |

(51) Int. Cl.

| | |
|---|---|
| G09G 3/32 | (2016.01) |
| G09G 3/34 | (2006.01) |
| G09G 3/36 | (2006.01) |

(52) U.S. Cl.
CPC ... *G09G 3/3648* (2013.01); *G09G 2310/0202* (2013.01); *G09G 2330/02* (2013.01)

(56) References Cited

U.S. PATENT DOCUMENTS

| | | | | | |
|---|---|---|---|---|---|
| 2012/0133290 | A1 | | 5/2012 | Hasegawa | |
| 2014/0097765 | A1 | | 4/2014 | Hussain et al. | |
| 2014/0122678 | A1 | * | 5/2014 | Miner ..................... | H04W 4/40 |
| | | | | | 709/223 |
| 2015/0062200 | A1 | | 3/2015 | Yang et al. | |
| 2015/0326117 | A1 | * | 11/2015 | Tischler ............. | H05B 45/3725 |
| | | | | | 315/185 R |
| 2017/0301301 | A1 | | 10/2017 | Pan et al. | |
| 2017/0311395 | A1 | | 10/2017 | Wu et al. | |
| 2018/0254004 | A1 | | 9/2018 | Hsiao | |
| 2021/0343254 | A1 | | 11/2021 | Ophir et al. | |
| 2022/0051630 | A1 | | 2/2022 | Shen et al. | |
| 2022/0415272 | A1 | * | 12/2022 | Xiong ................... | G09G 3/3426 |
| 2024/0221697 | A1 | * | 7/2024 | Zhang ...................... | G09G 3/32 |

FOREIGN PATENT DOCUMENTS

| | | | |
|---|---|---|---|
| CN | 102402949 | A | 4/2012 |
| CN | 102625540 | A | 8/2012 |
| CN | 102685521 | A | 9/2012 |
| CN | 105242752 | A | 1/2016 |
| CN | 103903548 | B | 3/2016 |
| CN | 106205497 | A | 12/2016 |
| CN | 107068105 | A | 8/2017 |
| CN | 107256697 | A | 10/2017 |
| CN | 107889313 | A | 4/2018 |
| CN | 107978281 | A | 5/2018 |
| CN | 105825821 | B | 9/2018 |
| CN | 108572687 | A | 9/2018 |
| CN | 108682402 | A | 10/2018 |
| CN | 108806620 | A | 11/2018 |
| CN | 108922479 | A | 11/2018 |
| CN | 109285514 | A | 1/2019 |
| CN | 109410828 | A | 3/2019 |
| CN | 109493811 | A | 3/2019 |
| CN | 110223643 | A | 9/2019 |
| CN | 209487136 | U | 10/2019 |
| CN | 110514854 | A | 11/2019 |
| CN | 110853570 | A | 2/2020 |
| CN | 111326120 | A | 6/2020 |
| CN | 211181602 | U | 8/2020 |
| CN | 111710278 | A | 9/2020 |
| CN | 109274910 | B | 11/2020 |
| CN | 111901930 | A | 11/2020 |
| CN | 112216712 | A | 1/2021 |
| CN | 112218293 | A | 1/2021 |
| CN | 212461689 | U | 2/2021 |
| CN | 212519507 | U | 2/2021 |
| CN | 112513822 | A | 3/2021 |
| CN | 112599095 | A | 4/2021 |
| CN | 112673415 | A | 4/2021 |
| CN | 113129841 | A | 7/2021 |
| CN | 113223443 | A | * | 8/2021 | .............. G09G 3/32 |
| CN | 213991108 | U | 8/2021 |
| CN | 113540060 | A | 10/2021 |
| CN | 113783408 | A | 12/2021 |
| CN | 113870770 | A | 12/2021 |
| CN | 114038432 | A | 2/2022 |
| CN | 114170974 | A | 3/2022 |
| CN | 114283750 | A | 4/2022 |
| CN | 114334935 | A | 4/2022 |
| CN | 114495807 | A | 5/2022 |
| CN | 114974146 | A | 8/2022 |
| CN | 115035866 | A | 9/2022 |
| CN | 115037419 | A | 9/2022 |
| CN | 115206249 | A | 10/2022 |
| CN | 115224182 | A | 10/2022 |
| CN | 115240604 | A | 10/2022 |
| CN | 115497425 | A | 12/2022 |
| CN | 115527500 | A | 12/2022 |
| CN | 115547267 | A | 12/2022 |
| CN | 115735246 | A | 3/2023 |
| CN | 116206557 | A | 6/2023 |
| CN | 116453474 | A | 7/2023 |
| CN | 116682339 | A | 9/2023 |
| CN | 116682340 | A | 9/2023 |
| CN | 116863878 | A | 10/2023 |
| CN | 116884358 | A | 10/2023 |
| CN | 116931623 | A | 10/2023 |
| CN | 219916625 | U | 10/2023 |
| JP | 2013167833 | A | 8/2013 |
| JP | 2015184508 | A | 10/2015 |
| KR | 20050055313 | A | 6/2005 |
| KR | 20160032812 | A | 3/2016 |
| KR | 102051949 | B1 | 1/2020 |
| TW | 202301007 | A | 1/2023 |

OTHER PUBLICATIONS

State Intellectual Property Office of China Notice of Grant of Utility Model Patent Rights for Application No. 202321165928.6 Sep. 1, 2023 2 pages (including translation).

State Intellectual Property Office of China Notice of Grant of Invention Patent Right for Application No. 202310547465.8 Jun. 3, 2024 6 pages (including translation).

China National Intellectual Property Administration (CNIPA) Office Action 1 for 202310547465.8 Apr. 26, 2024 8 Pages (including translation).

The World Intellectual Property Organization (WIPO) International Search Report and Written Opinion for PCT/CN2023/143671 Apr. 3, 2024 22 Pages (including translation).

The World Intellectual Property Organization (WIPO) International Search Report and Written Opinion for PCT/CN2023/143672 Apr. 15, 2024 22 Pages (including translation).

Ki-Chan Lee et al. "LED backlight driving system with local dimming and scanning driver IC." Journal of the Society for Information Display 18.2 (2010): 146-152.

Yuan-Ta HSIEH et al. "A high-dimming-ratio LED driver for LCD backlights." IEEE Transactions on Power Electronics 27.11 (2012): 4562-4570.

Honglei Ji et al. "Development and Challenges in Application of Mini-LED Backlight Technology in TV Products." Chinese Journal of Liquid Crystals and Displays 36.7 (2021): 983-992.

The World Intellectual Property Organization (WIPO) International Search Report for PCT/CN2024/083141 Jun. 19, 2024 7 Pages (including translation).

* cited by examiner 01   1-st row 02   2-nd row   21a 03   3-rd row 01   4-th row 02   5-th row   21b 03   6-th row 01   7-th row 02   8-th row   21c 03   9-th row

22

DIN1  DIN2  DIN1   10

At least one controller

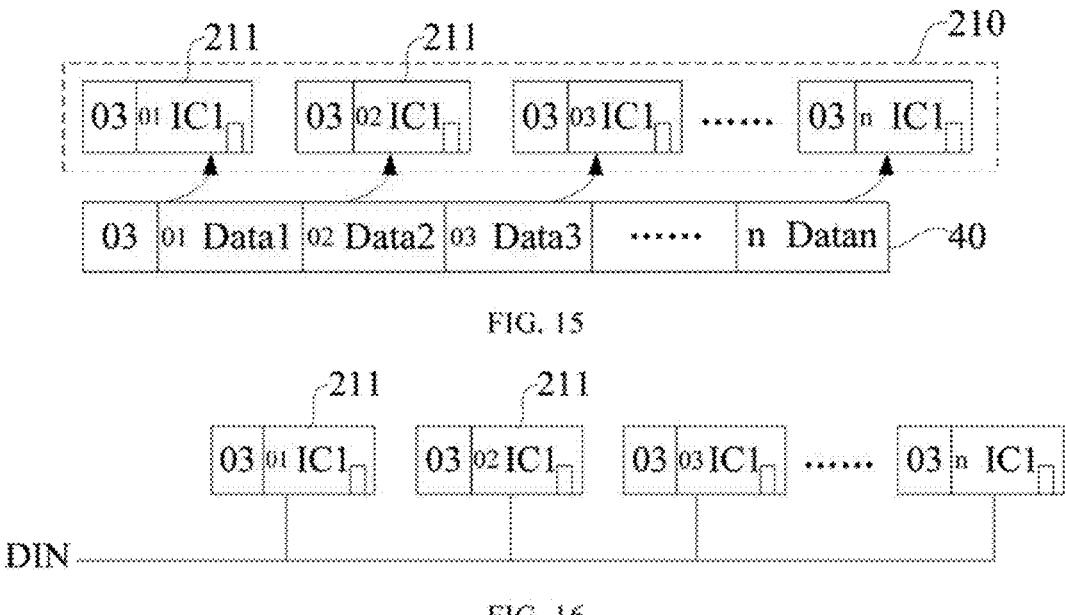
FIG. 15
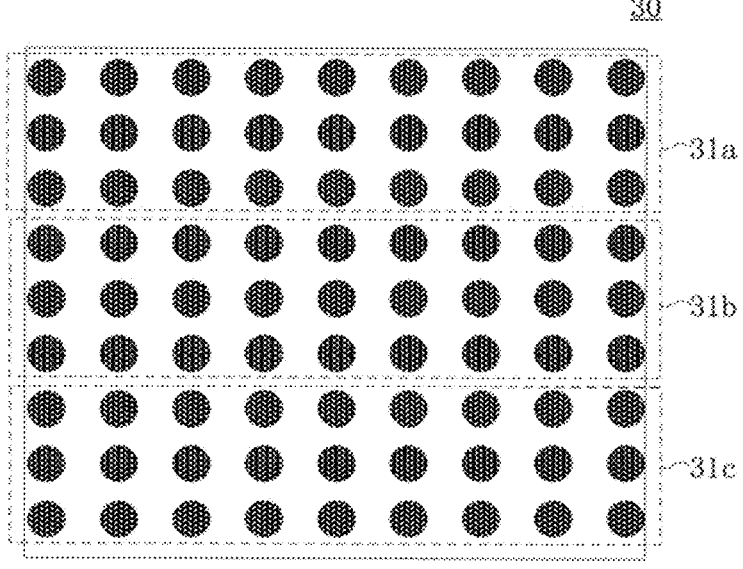
FIG. 16
<u>30</u>
FIG. 17A

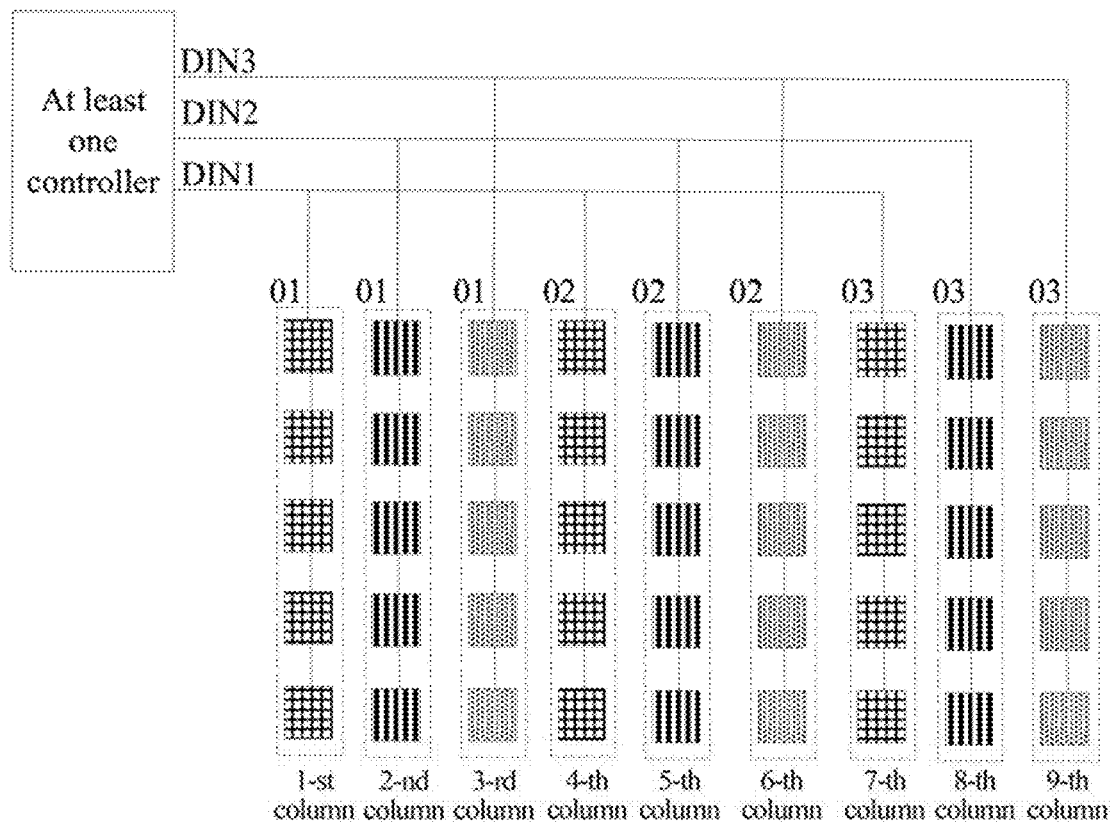

FIG. 19

| | |
|---|---|
| Generating, for each drive unit, drive data of the drive unit | S101 |

Sending, through the data lines corresponding to the plurality of drive units, to each drive unit, drive data of the drive unit using a parallel transmission manner, so that a respective drive chip in each drive group in the drive unit acquires, based on preset marking information of the drive group, corresponding drive data from the drive data of the drive unit — S102

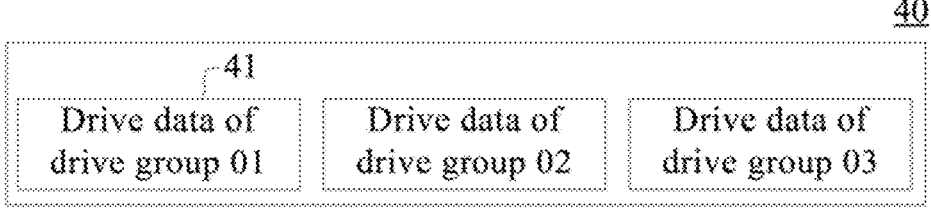

| Drive data of drive group 01 | Drive data of drive group 02 | Drive data of drive group 03 |

FIG. 21

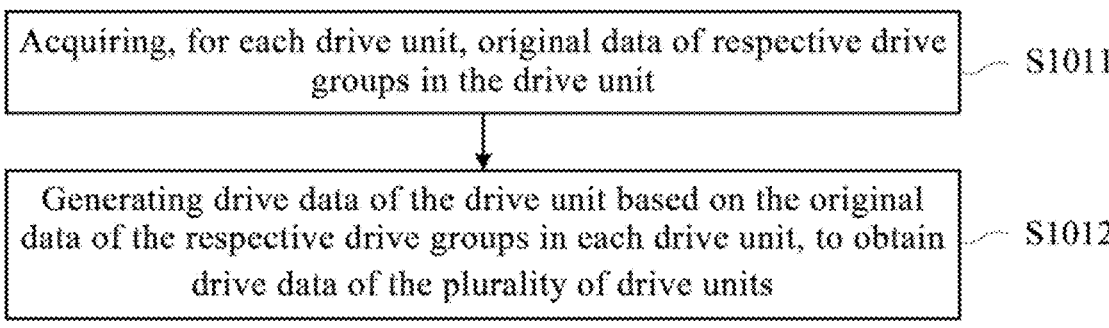

Acquiring, for each drive unit, original data of respective drive groups in the drive unit — S1011

Generating drive data of the drive unit based on the original data of the respective drive groups in each drive unit, to obtain drive data of the plurality of drive units — S1012

FIG. 22

Wave head    Valid data    Wave tail 411    412    413

FIG. 23

Validation time instants of the drive data of the drive groups

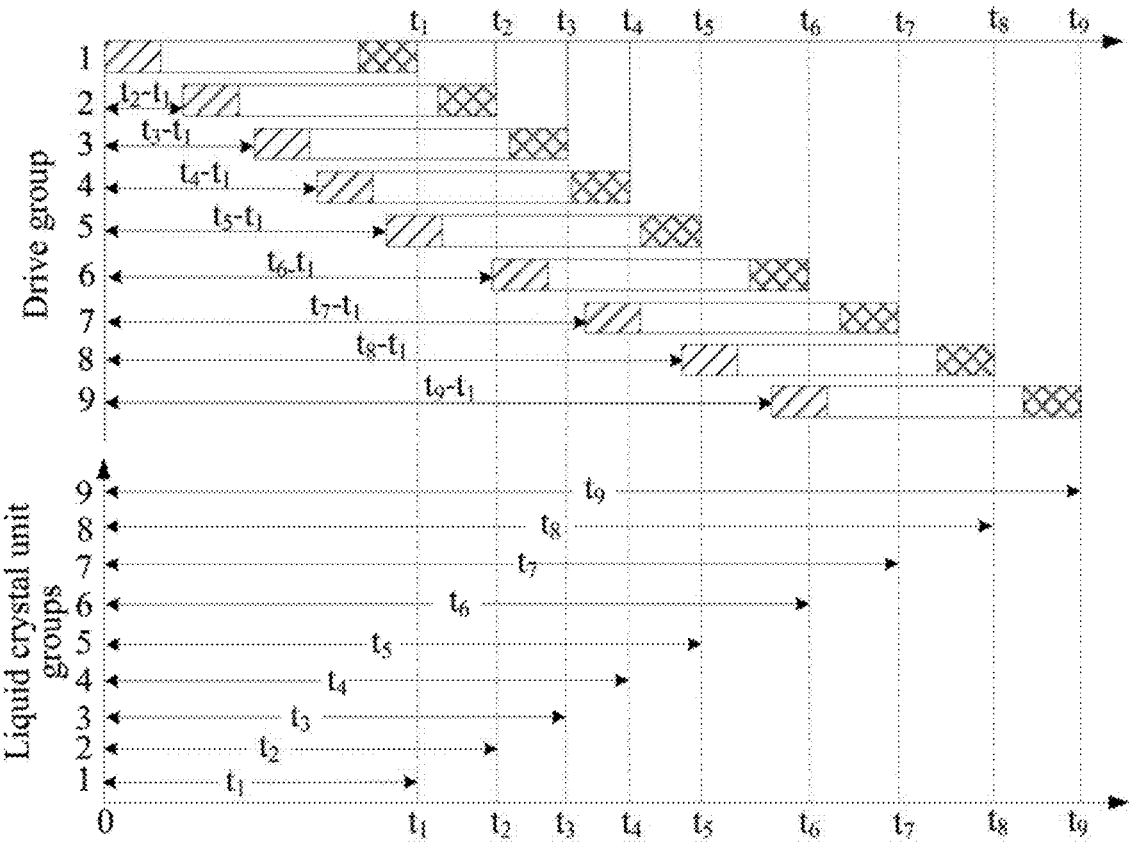

Time instants when the liquid crystal unit groups end flipping

FIG. 24

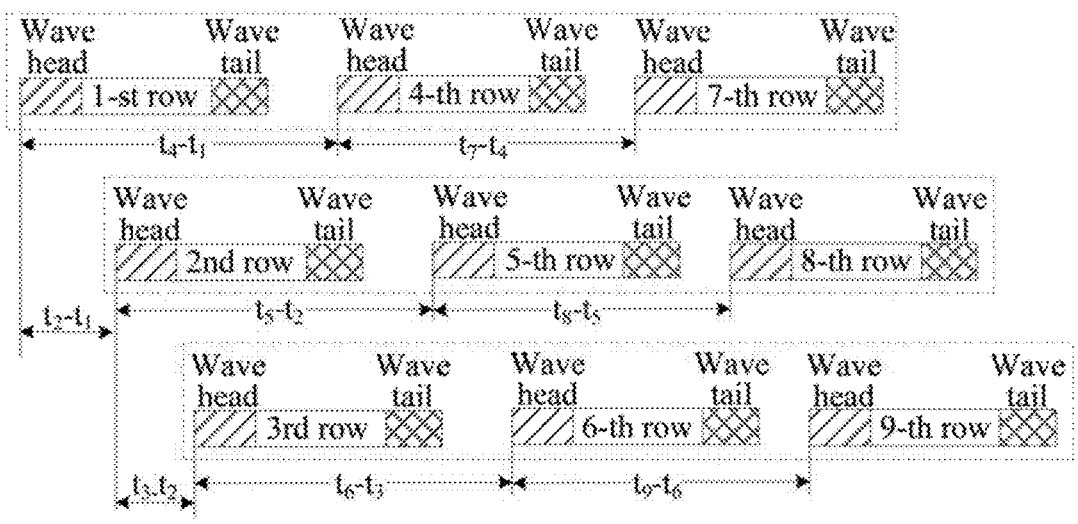
FIG. 25
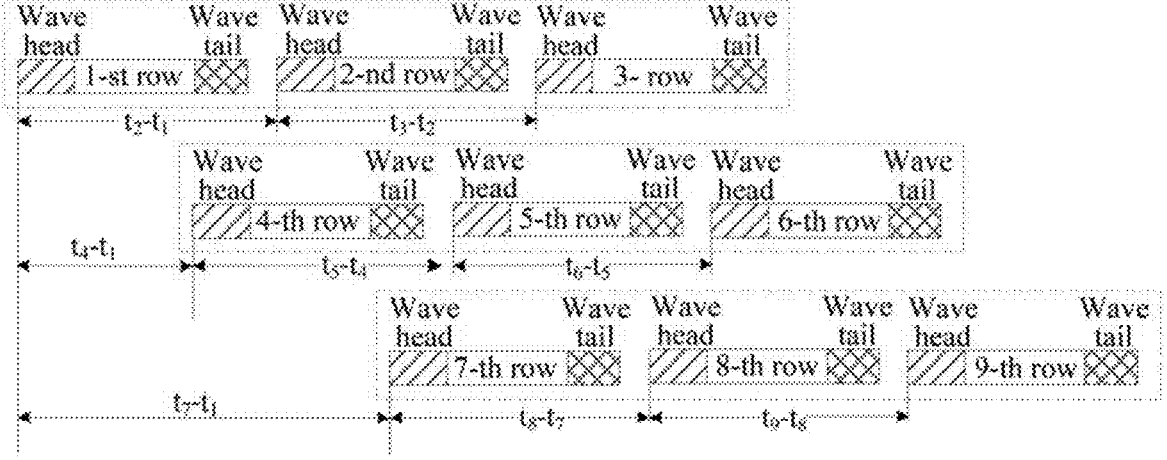
FIG. 26
FIG. 27

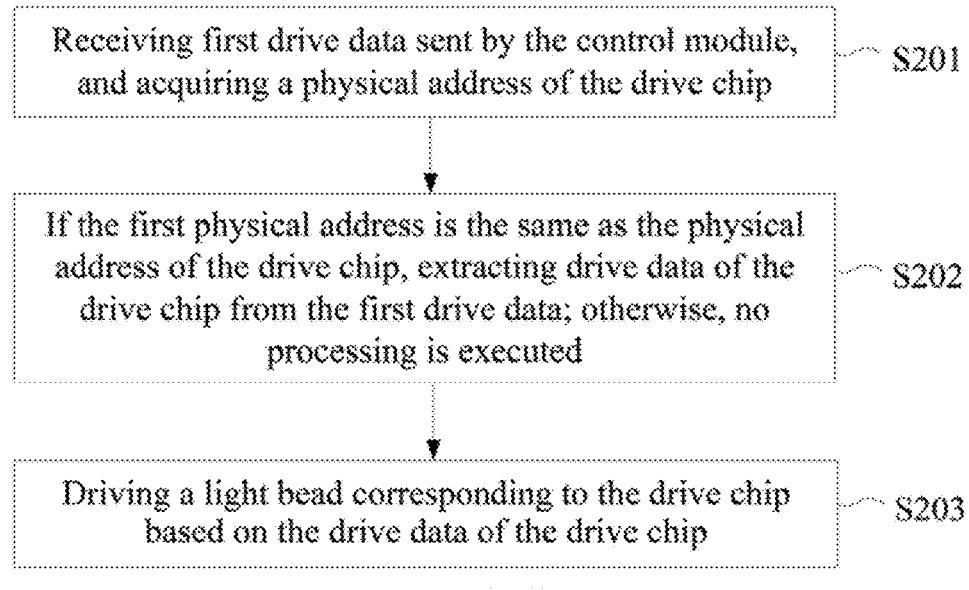

Receiving first drive data sent by the control module, and acquiring a physical address of the drive chip — S201

If the first physical address is the same as the physical address of the drive chip, extracting drive data of the drive chip from the first drive data; otherwise, no processing is executed — S202

Driving a light bead corresponding to the drive chip based on the drive data of the drive chip — S203

FIG. 28 n-th frame (n+1)-th frame

Pulse

Pulse signal segment

Non pulse signal segment

First control signal

FIG. 29

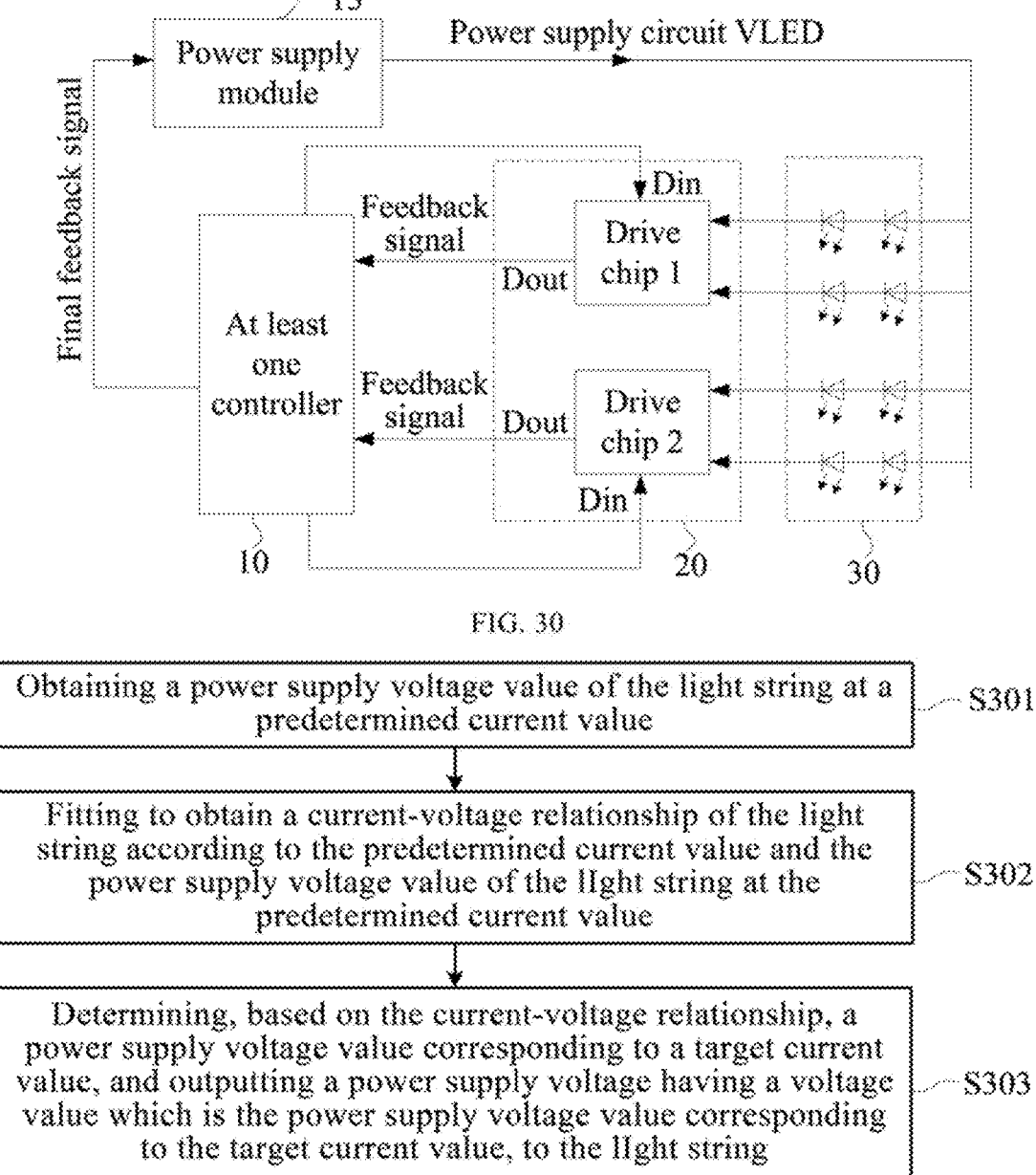

FIG. 30

| Obtaining a power supply voltage value of the light string at a predetermined current value | S301 |

| Fitting to obtain a current-voltage relationship of the light string according to the predetermined current value and the power supply voltage value of the light string at the predetermined current value | S302 |

| Determining, based on the current-voltage relationship, a power supply voltage value corresponding to a target current value, and outputting a power supply voltage having a voltage value which is the power supply voltage value corresponding to the target current value, to the light string | S303 |

FIG. 31

DISPLAY APPARATUS COMPRISING DRIVE CIRCUIT AND DRIVE CHIP CONFIGURED TO DRIVE LIGHT BEAD IN LIGHT BOARD

CROSS-REFERENCE TO RELATED APPLICATION

This application is a continuation application of International Application No. PCT/CN2023/143672, filed on Dec. 29, 2023, which claims priority to: Chinese Patent Application No. 202310280055.1, filed on Mar. 21, 2023 to the China National Intellectual Property Administration; Chinese Patent Application No. 202310485739.5, filed on Apr. 28, 2023 to the China National Intellectual Property Administration; Chinese Patent Application No. 202310485752.0, filed on Apr. 28, 2023 to the China National Intellectual Property Administration; and Chinese Patent Application No. 202310532469.9, filed on May 11, 2023 to the China National Intellectual Property Administration. All of the above applications are hereby incorporated by reference in their entireties.

TECHNICAL FIELD

The present application relates to a drive chip, a drive circuit, a display apparatus, and a data communication method.

BACKGROUND

A display apparatus is an apparatus for displaying images and/or user interfaces. The display apparatus is usually equipped with at least one controller, a drive circuit, and a plurality of light strings for providing backlight. The drive circuit is connected to the at least one controller through a data line, the at least one controller sends drive data to the drive circuit through the data line, the drive circuit drives a light string connected to it according to the drive data. Currently, it has become a research hotspot to reduce the quantity of the data lines in the display apparatus.

SUMMARY

Embodiments of the present application provide a drive chip, where preset marking information of the drive chip can be set in the drive chip, and the preset marking information can include an address of the drive chip; the drive chip can be electrically connected to at least one controller, and the at least one controller can be configured to send drive data to the drive chip based on the preset marking information of the drive chip; the drive chip can be electrically connected to at least one light bead and can be configured to drive the at least one light bead according to the drive data.

The embodiments of the present application further provide a drive circuit, where the drive circuit can include a plurality of drive units and a plurality of data lines, each drive unit can include a plurality of drive groups, each drive group can include at least one drive chip, the at least one drive chip comprises at least one first drive chip; each drive group has one piece of preset marking information, the preset marking information of the at least one first drive chip in the drive group may be preset marking information of the drive group; different drive groups in a same drive unit have different preset marking information, the preset marking information of the at least one first drive chip is set in the at least one first drive chip; the plurality of drive units can correspond one-to-one with the plurality of data lines, each drive unit can be connected to at least one controller through a corresponding data line; the at least one controller can be configured to send drive data to the drive group based on preset marking information of a drive group where a target drive chip is located, so that the target drive chip can acquire corresponding drive data; each drive chip of the drive group can be connected to at least one light bead in a light board, the target drive chip can be configured to drive the at least one light bead according to the drive data; and the light board can include a plurality of light beads arranged in an array.

The embodiments of the present application further provide a display apparatus, where the display apparatus can include a drive circuit, a light board, and at least one controller mentioned above.

The embodiments of the present application further provide a data communication method, where the method is for an electronic device, the electronic device can include at least one controller, the at least one controller can be connected to a drive circuit of a display apparatus through a plurality of data lines, the drive circuit can include a plurality of drive units, each drive unit can include a plurality of drive groups, each drive group has one piece of preset marking information, each drive group can include at least one drive chip; where the plurality of data lines can correspond one-to-one with the plurality of drive units, each drive unit can be connected to the at least one controller through a corresponding data line, all drive groups in each drive unit can be connected to the data line corresponding to the drive unit; the method can include: generating, for each drive unit, drive data of the drive unit; where the drive data of the drive unit can include drive data of a respective drive group in the drive unit, drive data of each drive group can include preset marking information of the drive group; and sending, through the data lines corresponding to the plurality of drive units, to each drive unit, the drive data of the drive unit using a parallel transmission manner, so that a respective drive chip in each drive group in the drive unit can acquire, based on preset marking information of the drive group, drive data corresponding to the respective drive chip from the drive data of the drive unit.

The embodiments of the present application further provide a data communication method, where the method is for a drive chip, a drive circuit corresponding to each drive chip can include a plurality of drive units, each drive unit can include a plurality of drive groups, each drive group can include at least one drive chip, the drive chip may correspond to at least one light bead, the drive circuit can be connected to at least one controller through a plurality of data lines, the plurality of data lines can correspond one-to-one with the plurality of drive units, each drive unit can be connected to the at least one controller through a corresponding data line; the method can include: receiving first drive data sent by the at least one controller, and acquiring preset marking information of the drive chip, where the first drive data can include first preset marking information; if the first preset marking information is same as the preset marking information of the drive chip, extracting drive data of the drive chip from the first drive data; otherwise, no processing is executed; where the first drive data can be generated by the at least one controller for each drive unit and sent through a data line corresponding to a drive unit to which a drive group where the drive chip is located belongs; first drive data of the drive unit can include drive data of a respective drive group in the drive unit, drive data of each drive group can include first preset marking information of the drive group, first preset marking information of respective drive groups in a same drive unit is different; and driving a light bead corresponding to the drive chip based on the drive data of the drive chip.

The embodiments of the present application further provide an electronic device, including: at least one processor, and a memory in connection with the at least one processor; where the memory can be configured to store computer executable instructions; the at least one processor can be configured to execute the computer executable instructions, to cause the electronic device to perform the above data communication method.

The embodiments of the present application further provide a computer readable non-volatile storage medium storing computer instructions thereon, where the computer instructions can be executed by a processor to enable a computer device to execute any data communication method as mentioned above.

BRIEF DESCRIPTION OF DRAWINGS

FIG. 15 is a schematic structure diagram of a drive group according to some other embodiments.

FIG. 16 is a schematic structure diagram of a drive group according to some further embodiments.

FIG. 17A is a schematic structure diagram of a light board according to some embodiments.

FIG. 19 is a schematic structure diagram of a drive circuit according to some other embodiments.

FIG. 20 is a schematic flowchart of a data communication method according to some embodiments.

FIG. 21 is a schematic structure diagram of drive data of a drive unit according to some embodiments.

FIG. 22 is a schematic flowchart of another data communication method according to some embodiments of the present application.

FIG. 23 is a schematic structure diagram of original data of a drive group according to some embodiments.

FIG. 24 is a schematic diagram of a relationship between a validation time instant of original data of a drive group and a first predetermined time instant of a corresponding liquid crystal unit group according to some embodiments.

FIG. 25 is a schematic structure diagram of drive data of a drive unit according to some other embodiments.

FIG. 26 is a schematic structure diagram of drive data of a drive unit according to some further embodiments.

FIG. 27 is a schematic structure diagram of drive data of a drive unit according to some further embodiments.

FIG. 28 is a schematic flowchart of a data communication method according to further embodiments of the present application.

FIG. 29 is a schematic structure diagram of a first control signal according to some embodiments.

FIG. 30 is a schematic diagram illustrating the coupling between multiple drive chips and at least one controller.

FIG. 31 is a schematic flowchart of a regulation method of power supply voltage according to some embodiments of the present application.

DESCRIPTION OF EMBODIMENTS

Figures 1, 2:
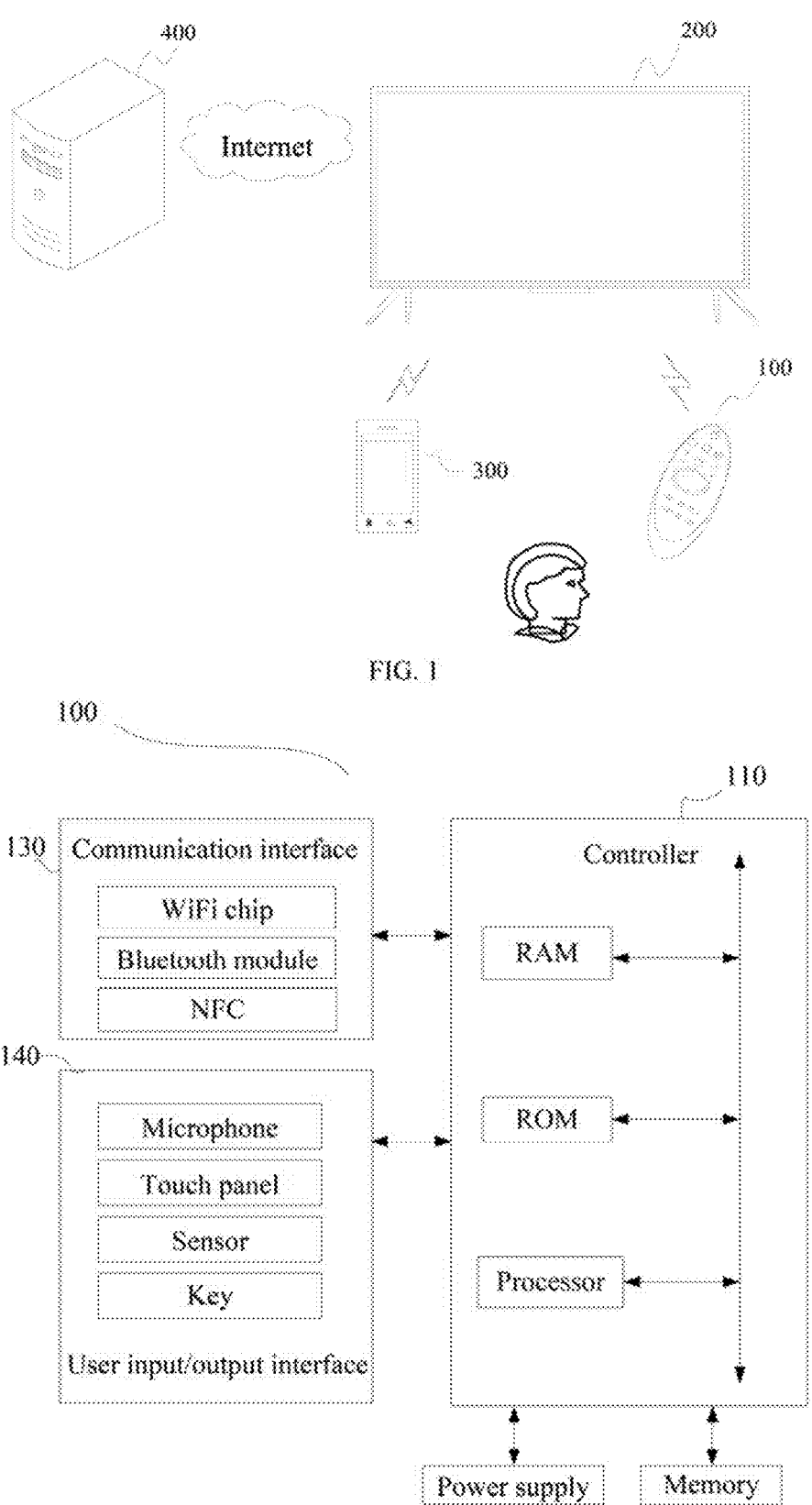
FIG. 1 is a schematic diagram of an operation scenario between a display apparatus and a control device according to some embodiments.
FIG. 2 is a block diagram of configurations of a control device 100 according to some embodiments.

Here, a detailed explanation of exemplary embodiments will be provided, which are illustratively presented in the drawings. When the following description involves drawings, unless otherwise represented, the same number in different drawings represents the same or similar elements. The implementations described in the following exemplary embodiments do not represent all embodiments consistent with the present application. On the contrary, they are only examples of apparatuses and methods consistent with some aspects as detailed in the appended claims and some aspects of the present application.

It should be noted that the brief explanation of terms in the present application is only for the convenience of understanding the implementations described below, and is not intended to limit the implementations of the present application. Unless otherwise specified, these terms should be understood according to their common and usual meanings.

The terms "first", "second", etc., in the description, claims, and the above drawings of the present application are used to distinguish similar objects or entities, but not necessarily mean limiting a specific order or sequence, unless otherwise indicated (Unless otherwise indicated). It should be understood that, the terms used in this way is interchangeable where appropriate, and for example, can be implemented in an order other than what is illustrated or described in the embodiments of the present application.

In addition, the terms "include" and "have" and any variations of them are intended to cover non-exclusive inclusion. For example, products or devices containing a series of components are not necessarily limited to those components that are clearly listed, but can include other components that are not clearly listed or are inherent to these products or devices. The term "circuit" used in the present application refers to any known or later developed hardware, software, firmware, artificial intelligence, fuzzy logic, or a combination of hardware and/or software codes capable of performing functions related to the element.

FIG. 1 is a schematic diagram showing an operation scenario between a display apparatus and a control device in some embodiments of the present application. As shown in FIG. 1, a user can operate a display apparatus 200 through an intelligent device 300 or a control device 100.

In some embodiments, the control device 100 may be a remote controller, and the communication between the remote controller and the display apparatus can include infrared protocol communication or Bluetooth protocol communication, as well as other short distance communication manner, to control the display apparatus 200 wirelessly or wiredly. Users can input user instructions through keys, voice input, or control panel input, etc. on the remote controller, to control the display apparatus 200.

In some embodiments, the intelligent device 300 (such as a mobile terminal, a tablet, a computer, a laptop, etc.) can also be used to control the display apparatus 200. For example, an application running on the intelligent device can be used to control the display apparatus 200.

In some embodiments, the display apparatus may receive user control through touch or gestures, instead of using the aforementioned intelligent device or control device to receive instructions.

In some embodiments, the display apparatus 200 may also be controlled using other means in addition to the control device 100 and the intelligent device 300. For example, it can be controlled by receiving the user's voice instructions directly through the module configured internally in the display apparatus 200 for acquiring the voice instructions, or it can also be controlled by receiving the user's voice instructions through a voice control device set externally to the display apparatus 200.

In some embodiments, the display apparatus 200 also can perform data communication with a server 400. It is possible to allow the display apparatus 200 to communicate and couple through a local area network (LAN), a wireless local area network (WLAN), and other networks. The server 400 can provide various contents and interactions to the display apparatus 200. The server 400 can be a cluster or a plurality of clusters, and can include one or more types of servers.

FIG. 2 is a block diagram showing configurations of the control device 100 in some embodiments of the present application. As shown in FIG. 2, the control device 100 can include a controller 110, a communication interface 130, a user input/output interface 140, a memory 160, and a power supply 150. The control device 100 can receive operation commands from a user, and convert the operation commands into instructions that the display apparatus 200 can recognize and respond to, playing a mediating role in the interaction between the user and the display apparatus 200.

Figure 3:
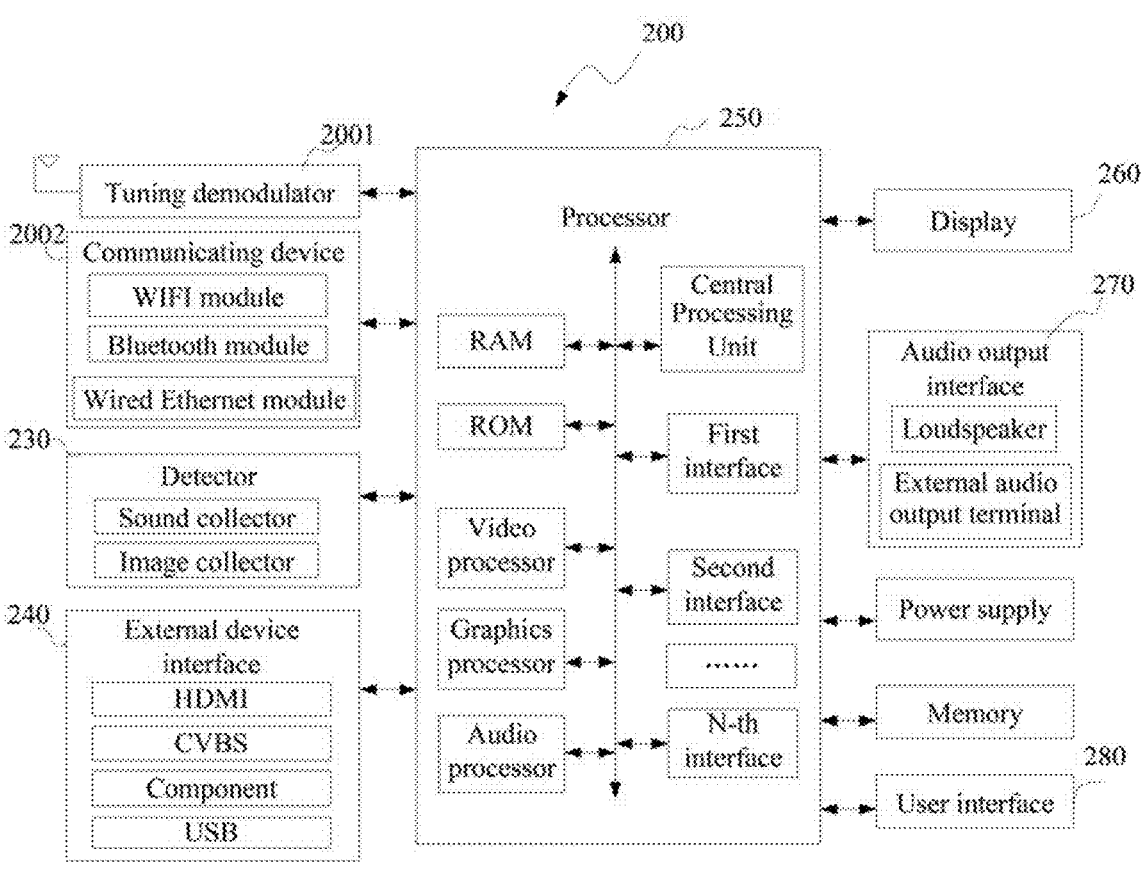
FIG. 3 is a schematic structure diagram of a display apparatus according to some embodiments.

FIG. 3 is a schematic structure diagram of a display apparatus in some embodiments of the present application. As shown in FIG. 3, the display apparatus 200 can include at least one of a tuning demodulator 2001, a communicating device 2002, a detector 230, an external device interface 240, a processor 250, a display device 260, an audio output interface 270, a memory 160, a power supply 150, and a user interface 280.

In some embodiments, the processor can include at least one processor, for example, a video processor, an audio processor, a graphics processor, a RAM, a ROM, and a first interface to an n-th interface for input/output.

The display device 260 can include: a display screen component for presenting images, as well as a drive component for driving image display, a component used for receiving image signals output from the controller, displaying video content, image content and a menu control interface, and a user control UI interface.

The display device 260 may be a liquid crystal display, an OLED (Organic Light-Emitting Diode) display, and a projection display device, as well as a projection apparatus and a projection screen.

The communicating device 220 can be a component configured to communicate with external devices or servers according to various communication protocols. For example, the communicating device may include at least one of a Wi-Fi module, a Bluetooth module, a wired Ethernet module, and other network communication protocol chip or near-field communication protocol chip, and an infrared receiver. The display apparatus 200 can establish the transmission and reception of control signals and data signals with the external control device 100 or the server 400 through the communicating device 220.

The user interface 280 can be configured to receive control signals from the control device 100 (such as an infrared remote controller, etc.).

The detector 230 can be configured to collect signals from external environments or signals for interaction with the outside. For example, the detector 230 can include an optical receiver, a sensor for collecting ambient light intensity; alternatively, the detector 230 may include an image collector, such as a camera, which can be used to capture external environmental scenes, user attributes, or user interaction gestures; further alternatively, the detector 230 may include a sound collector, such as a microphone, configured to receive external sound.

The external device interface 240 may include, but is not limited to, any one or more interfaces such as a high definition multimedia interface (HDMI), an analog or data high definition component input interface (component), a composite video input interface (CVBS), a USB input interface (USB), an RGB port, etc. It can also be a composite input/output interface formed by the above interfaces.

The tuning demodulator 210 can receive broadcast television signals through a wired or wireless reception manner, and demodulates audio and video signals, such as EPG data signals, from a plurality of wireless or wired broadcast television signals.

In some embodiments, the processor(s) 250 and the tuning demodulator 210 may be located in different individual devices, i.e. the tuning demodulator 210 may also be located in an external device of the main device where the processor(s) 250 is located, such as an external set top box, etc.

The processor(s) 250 can control the operation of the display apparatus and responds to user operations through various software control programs stored in the memory 160. The processor(s) 250 can control the overall operation of display apparatus 200. For example, in response to receiving a user command for selecting a UI object to be displayed on the display device 260, the processor(s) 250 can perform an operation related to an object selected by the user command.

In some embodiments, the processor can include at least one of a central processing unit (CPU), a video processor, an audio processor, a graphics processing unit (GPU), a random access memory (RAM), a backlight controller (ROM), a first interface to an n-th interface for input/output, a communication bus (Bus), etc.

A user can input a user command through a graphic user interface (GUI) displayed on the display device 260, and the user input interface can receive the input user command through the graphic user interface (GUI). Alternatively, the user can input the user command by inputting a specific sound or gesture, and the user input interface can recognize the sound or gesture through a sensor to receive the input user command.

The "user interface" may be a medium interface for interaction and information exchange between an application or an operating system and a user, which realizes the conversion between the internal form of information and the user-acceptable form of information. A common representation of the user interface is the graphic user interface (GUI), which refers to a user interface related to computer operations displayed in a graphical manner. It can be an icon, a window, a control and other interface elements displayed on the display screen of an electronic device, where the control can include a visual interface element such as an icon, a button, a menu, a tab, a text box, a dialog box, a status bar, a navigation bar, a Widget, etc.

Figure 4:
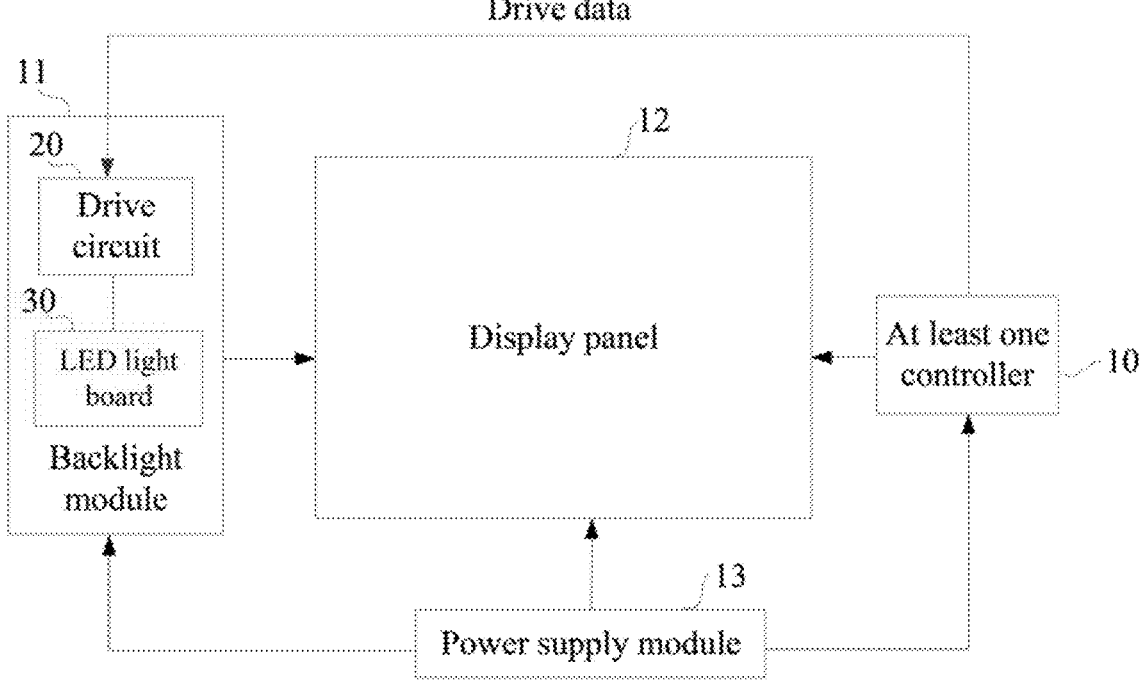
FIG. 4 is an architecture diagram of a display according to some embodiments.

FIG. 4 is a schematic diagram showing an architecture of a display device in some embodiments of the present application. As shown in FIG. 4, the display device can include a display panel 12, at least one controller 10 and a backlight module 11, and a power supply module 13.

The at least one controller 10, as a main control of the display device, can be configured to: receive signals from a computer or other video sources; determine and perform format conversion, timing control and other processing on backlight data and display data; and send the processed backlight data to a backlight component, as well as send the processed display data to the display panel. The at least one controller 10 may include a system on chip (abbreviated as SOC), a timing controller (abbreviated as Tcon), and a backlight controller (abbreviated as Bcon). In some embodiments, the Bcon may be replaced with a dimming controller (abbreviated as Dcon).

The display panel 12 can be connected to the at least one controller 10, and in some embodiments, the display panel 12 may be connected to the Tcon. The display panel 12 can include liquid crystal molecules, the liquid crystal molecules can be configured to deflect based on the processed display data received by the display panel and display an image based on the backlight provided by the backlight module.

The backlight module 11 can be connected to the at least one controller 10, and in some embodiments, the backlight module 11 may be connected to the Bcon or Dcon. The backlight module 11 can be configured to generate corresponding backlight based on the processed backlight data received by the backlight module.

The backlight module 11, from top to bottom, can include: a film, a diffusion plate, a bracket, a reflector, a light board, and a backboard, etc. Among them, the backboard can be configured as a substrate to provide support; light beads can be installed on the light board, which can be configured to provide backlight; the bracket can be configured to support the diffusion plate, the film, etc., to maintain an optical distance between the light board and the diffusion plate; the reflector can be configured to reflect the backlight from the light board in the direction of the diffusion plate; the backlight emitted from the light board can be provided to the display panel through a structure such as the diffusion plate, where the structure, such as the diffusion plate, can be configured to uniformize the brightness and angle of the light, so that the entire display panel is more uniform in the brightness distribution.

In some embodiments, the backlight module 11 can include a plurality of light boards, each light board can include a plurality of light-emitting areas, each light-emitting area (also known as a partition) can include a plurality of micrometer level light beads distributed in an array and corresponding one or more drive chips, each light bead may be an LED (Light Emitting Diode) light. On the light board, at least one light bead placed in a preset order can be in a serial connection to form a light string. The drive chip can be connected with the at least one corresponding light string. An arrangement order of the light beads on the light string may be a horizontal arrangement or a vertical arrangement, or an arrangement based on a preset pattern.

A drive chip of each partition can receive the processed backlight data sent by the Bcon, and drive, based on the processed backlight data, light beads on a light string connected to the drive chip to emit light, achieving local backlight control of the backlight module 11, i.e. achieving Local dimming, thereby achieving more accurate area lighting control and making the screen brightness more uniform and harmonious. Among them, the light board 30 may be composed of micro LEDs, including mini LEDs and OLEDs.

The power supply module 13 can be connected to the at least one controller 10, the display panel 12 and the backlight module 11, and can be configured to supply power to the at least one controller 10, the display panel 12 and the backlight module 11.

Figure 5:
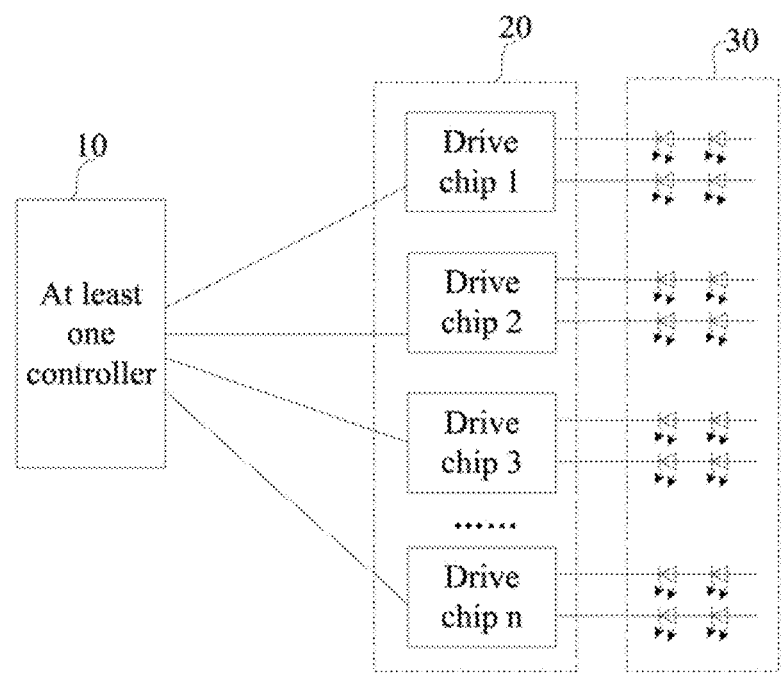
FIG. 5 is a schematic diagram illustrating the coupling between multiple drive chips and at least one controller.

FIG. 5 is a schematic diagram illustrating the coupling between a plurality of drive chips and at least one controller. As shown in FIG. 5, each drive chip needs to receive drive data sent by the at least one controller 10, each drive chip can be connected to at least one light string 30, the drive chip can drive a corresponding light string 30 according to the received data. In a display device, such as a Mini LED or a Microled, the quantity of the drive chips in the drive circuit 20 is very large, which requires the use of a large quantity of flexible flat cable (abbreviated as FFC). The volume and cost of a FFC are relatively high, and current display devices have lightweight requirements, which greatly increases the manufacturing difficulty and cost of the display devices.

Therefore, reducing the quantity of the data lines connected between at least one controller and a drive circuit in a display apparatus is important.

The technical content provided in the present application aims to solve the aforementioned technical problems in the relevant arts. The solution of the present application can reduce the quantity of the data lines connected between at least one controller and a drive circuit in a display apparatus, thereby decreasing the manufacturing difficulty and cost of the display apparatus.

In the below, specific embodiments are used to explain the present application in detail. The following specific embodiments can be combined with each other, and same or similar concepts or processes may not be repeated in some embodiments. In the description of the present application, unless otherwise specified and limited, each term shall be broadly understood within the field. In the below, the embodiments of the present application are described in conjunction with the drawings.

Figure 6:
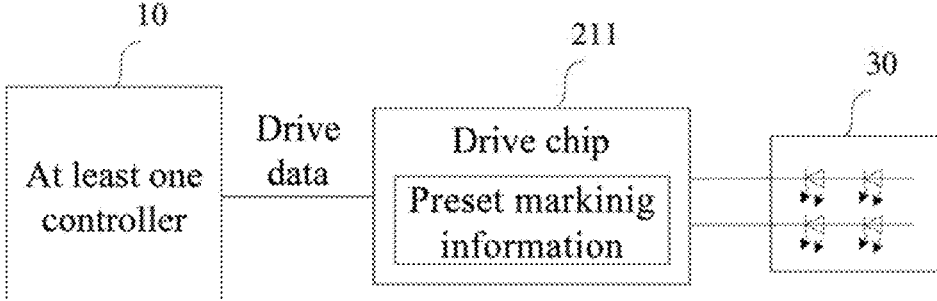
FIG. 6 is a schematic structure diagram of a drive chip according to some embodiments of the present application.

FIG. 6 is a schematic structure diagram of a drive chip in some embodiments of the present application, as shown in FIG. 6. Preset marking information may be set in a drive chip 211, the preset marking information can include an address of the drive chip. At least one controller 10 can be connected to the drive chip 211, the at least one controller 10 can be configured to send drive data to the drive chip 211 based on the preset marking information of the drive chip 211. The preset marking information can include the address of the drive chip 211.

The drive chip 211 can be connected to at least one light bead, the drive chip 211 can be configured to drive the at least one light bead according to the drive data.

The at least one controller 10 in some embodiments is a module that can send the drive data to the drive chip 211, the at least one controller 10 may be a Bcon or an Icon in some embodiments. The light bead is a light bead in a light string connected to the drive chip, each light bead may be a LED lamp. The drive data may be a voltage required for each frame to be displayed in a display device, the brightness of a light bead can be controlled based on a voltage magnitude; the drive data may also be a PWM signal, the drive chip 211 can control the corresponding light bead's on and off according to the drive data, and regulate brightness of the corresponding light bead based on a frequency and a duty cycle in the PWM signal.

Figure 7A:
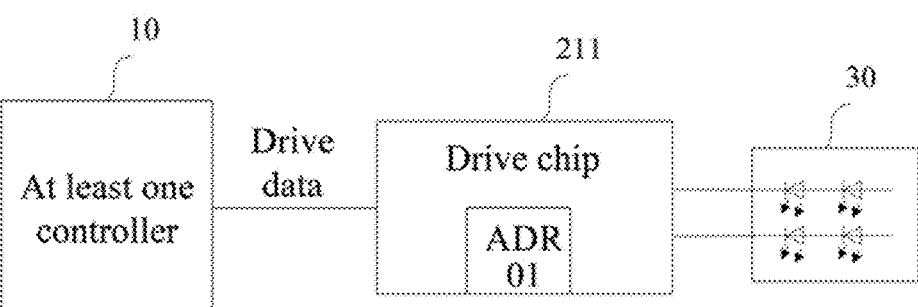
FIG. 7A is a schematic structure diagram of a drive chip according to some embodiments.

In some embodiments, a schematic structure diagram of the drive chip 211 is shown in FIG. 7A.

The drive chip 211 may be arranged with an address pin ADR, the preset marking information can include configuration information of the address pin; the address pin ADR can be configured to set a physical address of the drive chip 211.

The at least one controller 10 can be connected to the drive chip 211, the at least one controller 10 can be configured to send the drive data to the drive chip 211 based on an address of the drive chip 211, the address of the drive chip 211 can include the physical address of this chip.

The drive chip 211 can be connected to the at least one light bead, the drive chip 211 can be configured to drive the at least one light bead according to the drive data.

Figures 7B, 8A, 8B:
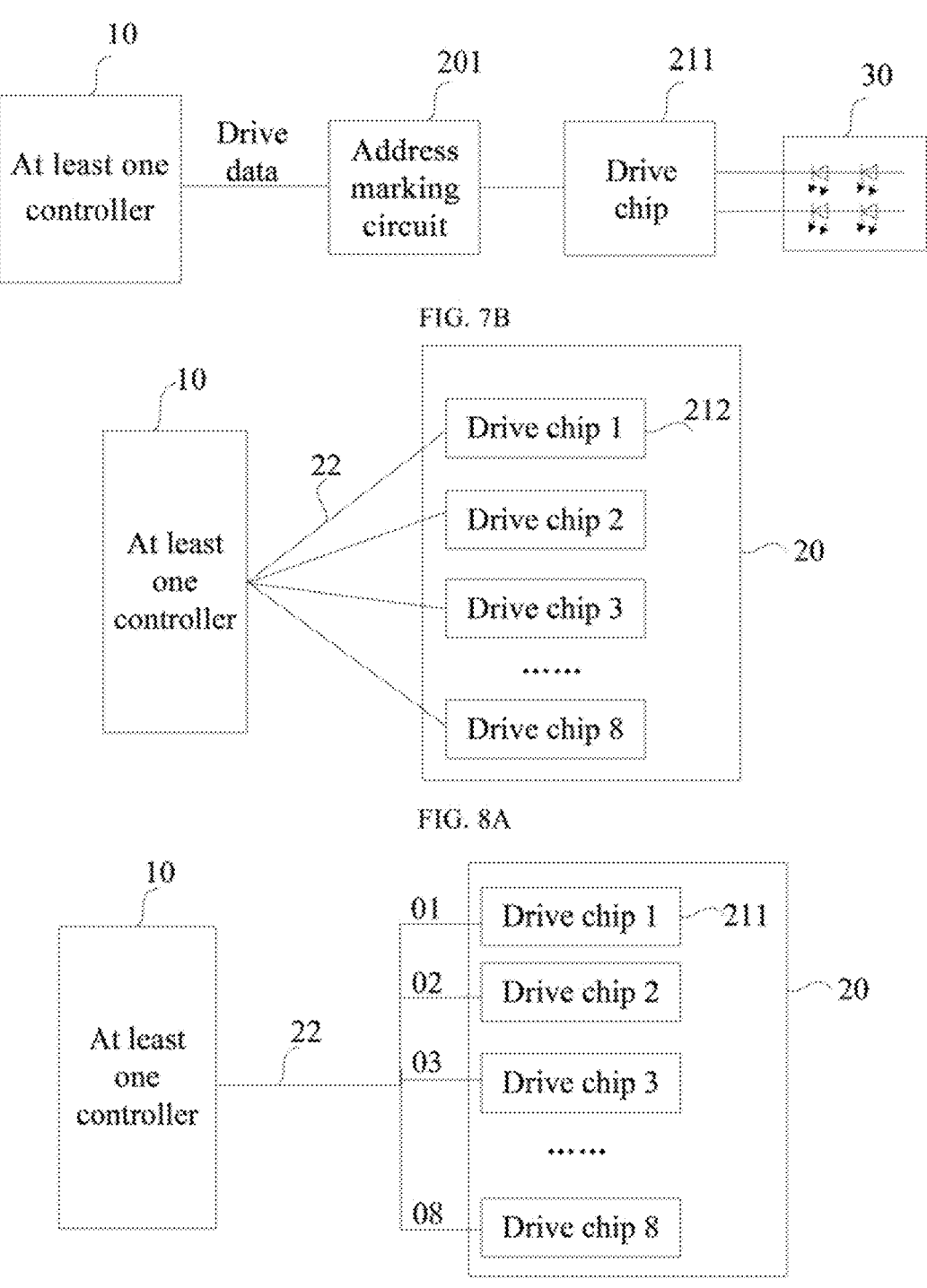
FIG. 7B is a schematic structure diagram of a drive chip according to some other embodiments.
FIG. 8A is a schematic structure diagram of a drive circuit according to some embodiments.
FIG. 8B is a schematic structure diagram of a drive circuit according to some other embodiments.

In another case, another schematic structure diagram of the drive chip 211 is shown in FIG. 7B.

There is a corresponding address marking circuit 201 set before the drive chip 211. A control terminal and a first terminal of the address marking circuit 201 can be connected to the at least one controller 10, and an output terminal of the address marking circuit 201 can be connected to an input terminal of the corresponding drive chip 211.

The address marking circuit 201 can be configured to acquire address data output by the at least one controller 10 from its control terminal, and send drive data acquired by its first terminal to the corresponding drive chip 211 when the address data includes the address of the drive chip 211 that is electrically connected to it. A different address marking circuit 201 may correspond to different address data.

The drive chip 211 can be connected to at least one light bead, the drive chip 211 can be configured to drive the at least one light bead according to the drive data.

In the below, an embodiment will be discussed for illustration combining with an example: FIG. 8A is a schematic diagram showing structure of a drive circuit in some embodiments of the present application. As shown in FIG. 8A, the drive circuit 20 can include 8 ordinary drive chips 212 without preset marking information; since 8 ordinary drive chips are the same and cannot be recognized, the at least one controller 10 can only connect to these eight ordinary drive chips 212 respectively through 8 data lines and send drive data to the corresponding ordinary drive chips 212 through 8 data lines.

FIG. 8B is a schematic structure diagram of a drive circuit according to some other embodiments. As shown in FIG. 8B, the drive circuit 20 can include 8 drive chips 211 with physical addresses, the physical addresses of these 8 drive chips 211 are different, and respectively are 01, 02, 03, . . . , and 08. The at least one controller 10 can be connected, through 1 data line, to a substrate where these 8 drive chips 211 are located and send drive data through this data line, where the drive data can carry the physical addresses of the drive chips 211. In this way, based on the physical addresses, the drive data can be sent to the corresponding the drive chips 211. It can be known from the above mentioned, 7 data lines can be reduced in the drive circuit in FIG. 8B compared to the drive circuit in FIG. 8A.

In some embodiments, the drive chip can set the physical address based on the address pin, the at least one controller can send drive data to the plurality of drive chips with different physical addresses through one data line, it is not necessary to respectively connect the at least one controller to the drive chips. In this way, the quantity of the data lines connected between the at least one controller and the drive chips can be reduced, therefore the quantity of FFCs connected between the at least one controller and the drive circuit in the display device can be reduced.

Figure 8C:
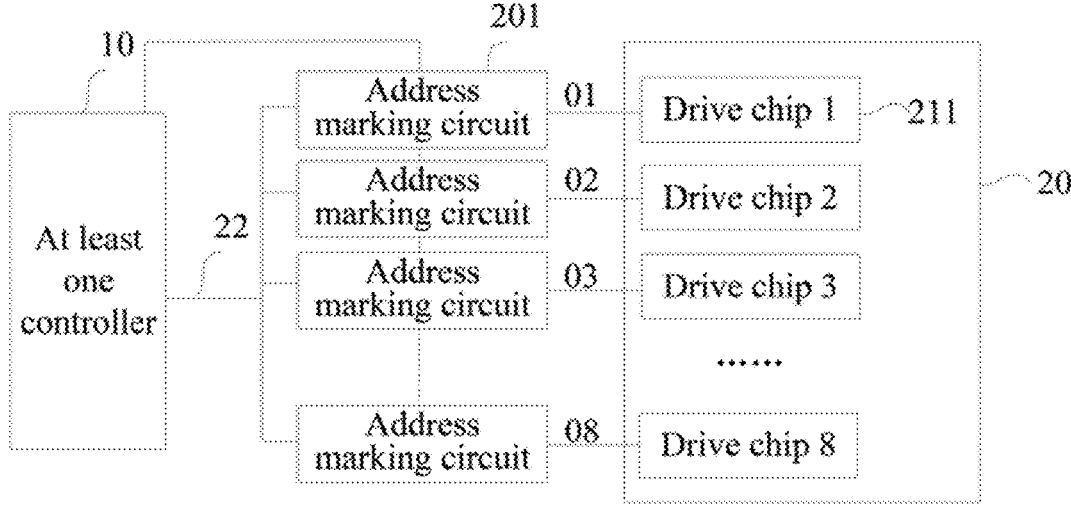
FIG. 8C is a schematic structure diagram of a drive circuit according to some other embodiments.

FIG. 8C is a schematic structure diagram of a drive circuit according to some other embodiments. As shown in FIG. 8C, the drive circuit 20 can include 8 drive chips 211 and 8 address marking circuits, address data of these 8 address marking circuits are different, the address data is respectively 000, 001, 010, . . . , and 111. The at least one controller 10 can be connected to a substrate where these 8 address marking circuits are located through 4 data lines, where 3 data lines can be configured to transmit the address data, 1 data line can be configured to transmit drive data. In this way, based on address information transmitted by the 3 data lines, a corresponding address marking circuit can be controlled to be conductive, the drive data acquired by input terminal of the address marking circuit can be transmitted to the corresponding the drive chips 211. It can be known from the above mentioned, 4 data lines can be reduced in the drive circuit in FIG. 8C compared to the drive circuit in FIG. 8A.

In the below, the setting of physical address of a drive chip will be discussed for illustration.

According to some embodiments, a drive chip further can include: a plurality of functional pins, where each functional pin may correspond to a physical address, physical addresses corresponding to different functional pins are different; where an address pin can be connected to a functional pin; and a physical address of the drive chip is a physical address corresponding to a functional pin connected to the address pin.

Figure 9A:
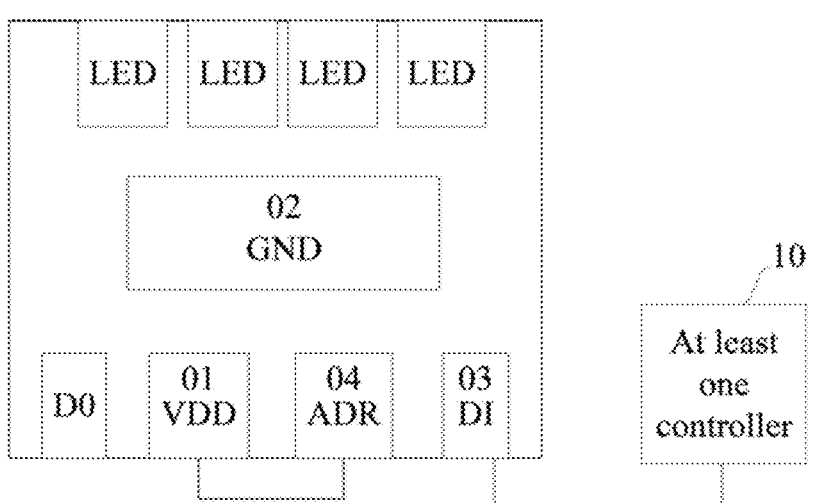
FIG. 9A is a schematic structure diagram of a drive chip with a physical address according to some embodiments.
Figure 9B:
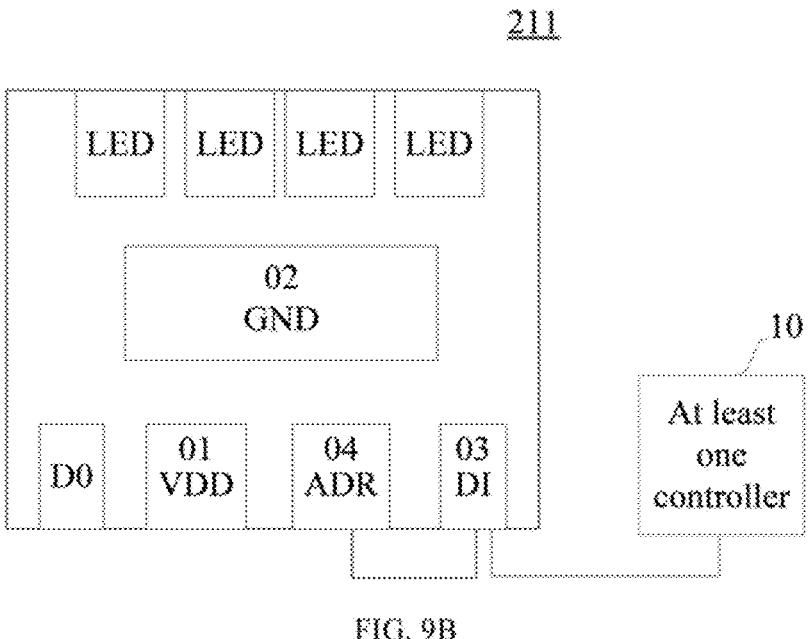
FIG. 9B is a schematic structure diagram of a drive chip with a physical address according to some other embodiments.

For example, FIG. 9A is a schematic structure diagram of a drive chip with a physical address according to some embodiments, FIG. 9B is a schematic structure diagram of a drive chip with a physical address according to some other embodiments. As shown in FIG. 9A and FIG. 9B, the functional pins include a power supply pin VDD, a data input pin DI, and a ground pin GND with corresponding physical addresses 01, 02, and 03 respectively. The address pin ADR can be connected to any functional pin, a physical address of the address pin is the same as a physical address of the functional pin. Referring to FIG. 9A, the address pin ADR can be connected to the power supply pin VDD. Due to that a physical address of the power supply pin VDD is 01, the physical address of the drive chip 211 is 01. As also shown in FIG. 9B, the address pin ADR can be connected to the data input pin DI. Due to that a physical address of the data input pin DI is 03, the address pin ADR of the drive chip 211 is 03. In some embodiments, in order to increase the quantity of the physical addresses of the drive chip 211, the physical address of the address pin ADR can also be preset to 04. That is, when the address pin ADR is in an idle state, the physical address of the drive chip 211 is 04.

In the below, the principle of a drive chip sensing a physical address in an embodiment will be discussed: continuing referring to FIG. 9A and FIG. 9B, the drive chip 211 can acquire a corresponding physical address by detecting a level of the address pin ADR. Combining with the above FIG. 9A and FIG. 9B, the functional pin ADR can include the power supply pin VDD, the data input pin DI, the ground pin GND, and an idle pin (the address pin ADR itself), where levels corresponding to different functional pins are different.

When the address pin ADR can be connected to the power supply pin VDD, due to the power supply pin VDD is a high level, the address pin ADR is a high level. When the address pin ADR can be connected to the ground pin GND, due to the ground pin GND is a low level, the address pin ADR is a low level. When the address pin ADR can be connected to the data input pin DI, due to a level of the data input pin DI is the same as a level of its input data and the level of the input data is variable, the level of the address pin ADR is variable. When the address pin ADR is idle, there is no level at the address pin ADR. Therefore, the drive chip 211 can sensing the physical address of the drive chip 211 based on the level of the address pin ADR.

In this example, based on the connection between the address pin and a functional pin, a physical address of the functional pin can be determined as the physical address of the drive chip. The solution mentioned above only adds a connection line between existing functional pins, without adding an additional component to obtain a physical address. In this way, the physical address of the drive chip can be acquired based on a simple structure.

Figure 10:
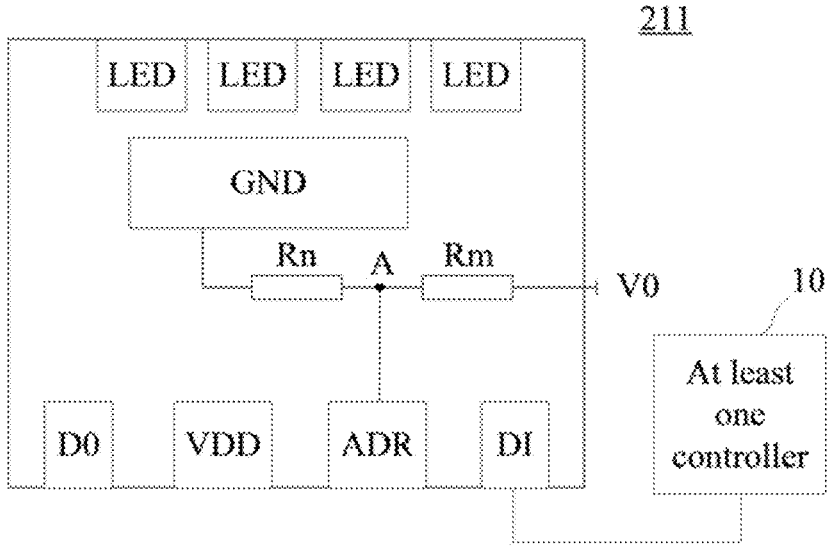
FIG. 10 is a schematic structure diagram of a drive chip according to some other embodiments.

In some embodiments, the quantity of the functional pins of the drive chip is limited, so in order to acquire more physical addresses, according to some other embodiments, FIG. 10 is a schematic structure diagram of a drive chip according to some further embodiments. As shown in FIG. 10, the drive chip 211 further can include: a sampling resistor Rm, where a terminal of the sampling resistor Rm can receive a fixed voltage V0, and another terminal of the sampling resistor Rm can be connected to the address pin ADR; and different resistance values of the sampling resistor Rm correspond to different physical addresses; and a fixed resistor Rn, where a terminal of the fixed resistor Rn can be connected to another terminal of the sampling resistor Rm, another terminal of the fixed resistor Rn is grounded.

In this example, as shown in FIG. 10, the sampling resistor Rm and the fixed resistor Rn may be voltage dividing resistors, a resistance value of the fixed resistor Rn remains unchanged, therefore, a resistance value of the sampling resistor Rm affects a voltage at point A, and as such affects a voltage of the address pin ADR. For example, the larger the resistance value of the sampling resistor Rm, the higher the voltage at point A and the higher the voltage of the address pin ADR. There is a corresponding relationship set between a physical address and a voltage, therefore the physical address of the drive chip 211 at a current voltage can be acquired by detecting the voltage of the address pin ADR and based on the corresponding relationship between a physical address and a voltage. In this way, the quantity of the physical addresses of the drive chip 211 can be unrestricted by the quantity of the functional pins of the drive chip 211, therefore more drive chips with different physical addresses can be obtained in this example.

In some embodiments, the drive chip may be arranged with an address pin; based on the address pin, a plurality of drive chips can be set to have different physical addresses, at least one controller can send drive data to the plurality of drive chips based on the different physical addresses. In this way, the at least one controller can communicate with the plurality of drive chips with the different physical addresses through one data line rather than a plurality of data lines. Therefore, this embodiment can reduce the quantity of the data lines connected between the at least one controller and the drive chips, thereby decreasing the manufacturing difficulty and cost of the display device.

Figures 11, 12:
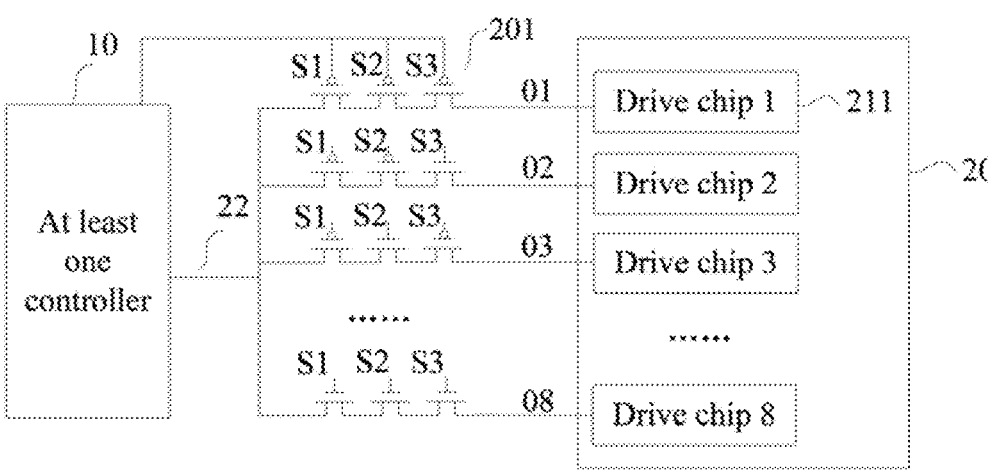
FIG. 11 is a schematic structure diagram of a drive chip set with an address marking circuit according to some other embodiments.
FIG. 12 is a schematic structure diagram of a drive circuit according to some other embodiments of the present application.

FIG. 11 is a schematic structure diagram of a drive chip set with an address marking circuit according to some embodiments, where a respective address marking circuit may be arranged with three switches, a conduction mode of a respective switch can include low-level conduction and high-level conduction; in an order from left to right, types of these three switches can correspond to their corresponding address data. For example, when the address data corresponding to these three switches is 010, and the types of the switches are PMOS, NMOS, and PMOS, they can be conductive when obtaining a low level, a high level, and a low level correspondingly; where a respective level may correspond to an address bit. According to an arrangement order of the three switches, an address data including the address bits corresponding to the low level, the high level, and the low level is represented by a digital signal as 010, the address marking circuit can be conductive, and its electronically connected drive chip can obtain the drive data.

In some embodiments, by setting a small quantity of controllable switches upstream of the drive chip, strobe of the address can be realized, thereby simplifying the circuit structure and decreasing the manufacturing difficulty of the display device.

On the basis of the embodiments mentioned above, another embodiment provides a drive circuit, where the drive circuit can include: a plurality of drive units and a plurality of data lines, each drive unit can include a plurality of drive groups, each drive group can include at least one drive chip; at least one drive chip can include at least one drive chip 211 as mentioned in any example or embodiment mentioned above; each drive group have one piece of preset marking information, the preset marking information of the at least one drive chip 211 in the drive group is preset marking information of the drive group; different drive groups in a same drive unit have different preset marking information; the plurality of drive units can correspond one-to-one with the plurality of data lines, each drive unit can be connected to the at least one controller through a corresponding data line; the at least one controller can be configured to send drive data to the drive group based on preset marking information of a drive group where a target drive chip is located, so that the target drive chip can acquire corresponding drive data; each drive chip of the drive group can be connected to at least one light bead in light board, the target drive chip can be configured to drive the at least one light bead according to the drive data; and the light board can include a plurality of light beads arranged in an array.

The drive circuit according to some embodiments can be applicable for scenarios where a light board has numerous partitions. For example, there is numerous drive chips in a display device of a Mini LED; in order to improve the universality of drive chips, preset marking information cannot be set as much. Therefore, the drive circuit provided by this embodiment can include a plurality of drive units, and each drive unit can include a plurality of drive chips.

In the below, an embodiment will be discussed for illustration combining with a specific example: FIG. 12 is a schematic structure diagram of a drive circuit according to some other embodiments of the present application. As shown in FIG. 12, the drive circuit can include a first drive unit 21*a*, a second drive unit 21*b*, and a third drive unit 21*c*, the first drive unit 21*a* can include drive groups from a 1st row to a 3rd row, physical addresses of the respective drive groups are 01, 02, and 03 in sequence; the second drive unit 21*b* can include drive groups from a 4th row to a 6th row, physical addresses of the respective drive groups are 01, 02, and 03 in sequence; the third drive unit 21*c* can include drive groups from a 7th row to a 9th row, physical addresses of the respective drive groups are 01, 02, and 03 in sequence. It can be seen that the physical addresses of different drive groups in each drive unit are different; three drive units can be connected to at least one controller 10 respectively through a data line DIN1, a data line DIN2, and a data line DIN3, and each drive chip 211 in the drive unit can acquire corresponding drive data.

Figure 13:
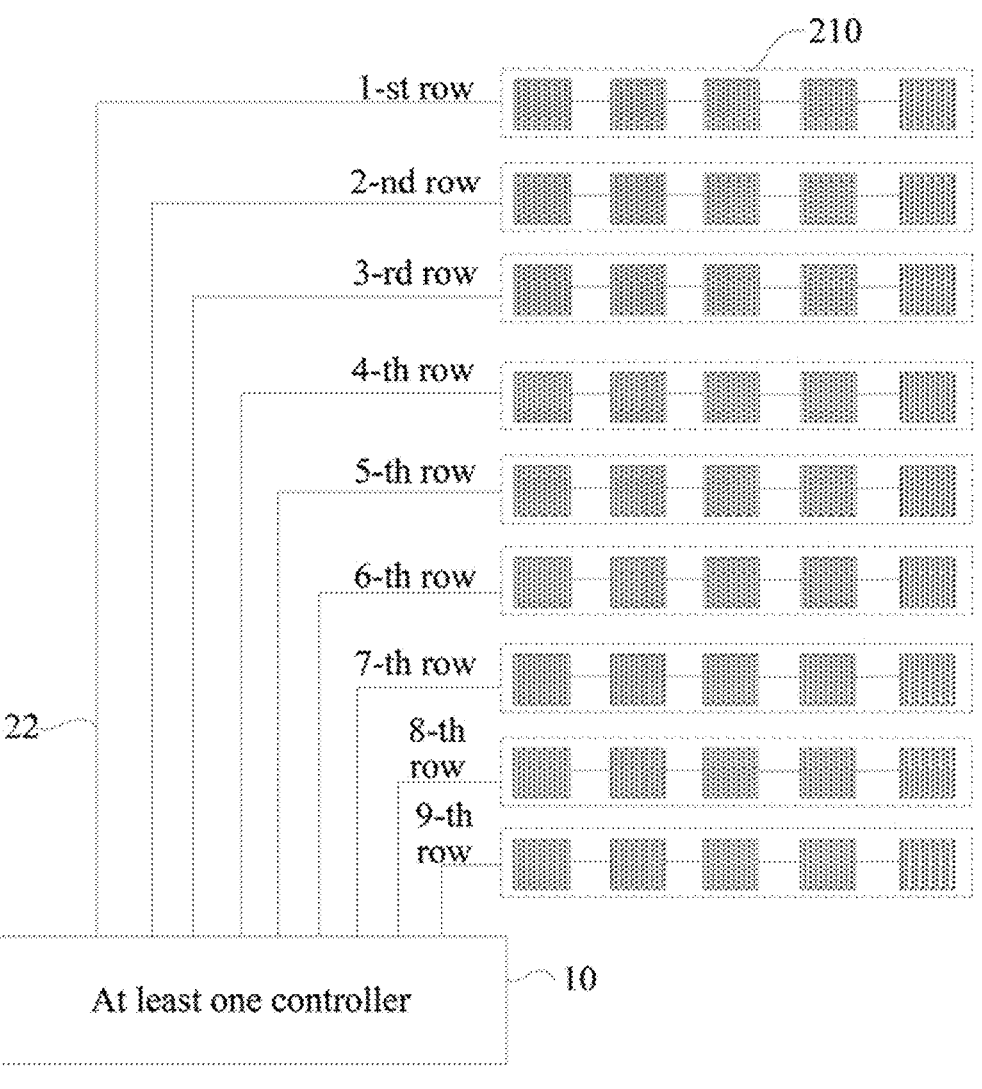
FIG. 13 is a schematic structure diagram of a drive circuit in related arts.

FIG. 13 is a schematic structure diagram of a drive circuit in related arts. As shown in FIG. 13, the drive circuit can include 9 drive groups 210, no preset marking information is set in these drive groups 210. At least one controller 10 cannot recognize every drive group 210, so it needs to send drive data to a corresponding drive group separately through 9 data lines. In this way, the at least one controller needs to communicate with 9 drive groups through 9 data lines. However, the solution in FIG. 12 only requires 3 data lines for communication between the at least one controller and 9 drive groups.

It can be known from the above embodiments, compared to the related arts, these embodiments can reduce the quantity of the data lines between the at least one controller and the respective drive groups, thereby reducing the quantity of the data lines in the drive circuit. There is another drive circuit in the related arts, that is, all drive chips can be connected in series using one data line, drive data can be sent to the drive chips in sequence by this data line, and the drive chips sequentially read data in sequence. In this way, the transmission rate of data is greatly decreased, thereby affecting image quality of the display apparatus. Therefore, compared to the related arts, the circuit provided by this embodiment can ensure the transmission rate of drive data and reduce the quantity of the data lines at the same time.

Figure 14:
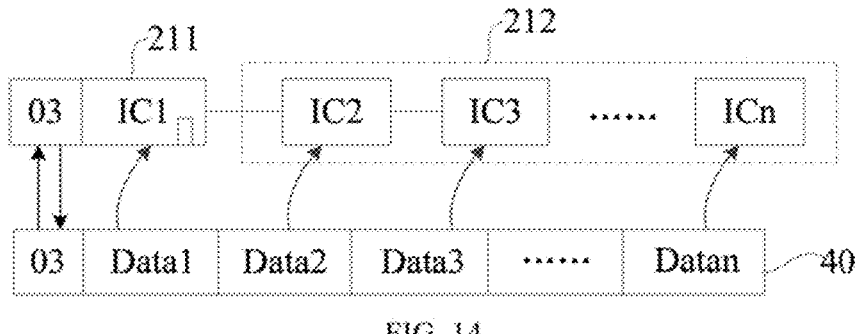
FIG. 14 is a schematic structure diagram of a drive group according to some embodiments.

According to some embodiments, FIG. 14 is a schematic structure diagram of a drive group in some embodiments of the present application. As shown in FIG. 14, each drive group can include one first drive chip 211 and a plurality of second drive chips 212 (these second drive chips are ordinary drive chips) that can be connected in series. The first drive chip 211 is located before the plurality of second drive chips 212, the first drive chip 211 is the drive chip 211 set with preset marking information in any embodiment mentioned above, the preset marking information of the first drive chip 211 is preset marking information of the drive group to which it belongs.

In this example, the drive group only can include one first drive chip 211 with preset marking information, the preset marking information of the drive group is preset marking information of the first drive chip 211, others are those second drive chips 212 without preset marking information; and the first drive chip 211 and these second drive chips 212 can be connected in series, that is to say, the first drive chip 211 and the plurality of second drive chips 212 can be connected in sequence. The drive data sent by at least one controller 10 can include drive data of all drive chips in the drive group; after the first drive chip acquires corresponding drive data, other second drive chips 212 can acquires corresponding drive data in sequence.

In the below, an embodiment of a drive chip acquiring corresponding drive data will be discussed for illustration combining with an example: as shown in FIG. 14, the drive group can include the first drive chip 211 and the plurality of drive chips 212 located after the first drive chip 211; when the preset marking information in the first drive chip is a physical address, the physical address of the first drive chip 211 is 03, the second drive chips 212 do not have a physical address, a physical address of the drive group is also 03; at least one controller 10 can send drive data 40 of the drive group, where the drive data of the drive group can include the physical address 03 of the drive group. Therefore, the drive data of the drive group will be correspondingly sent to the drive group with the physical address 03. At this time, if a physical address in the drive data is detected to be same with its physical address, the first drive chip 211 can acquire corresponding drive data Data1; due to that the subsequent second drive chips 212 can be connected to the first drive chip 211 in series, these second drive chips 212 can sequentially acquire Data2, Data3, . . . , Datan.

In the drive group of this example, only a drive chip located in a first position can be set as the first drive chip with a physical address, other serial connected second drive chips are all drive chips without a physical address. The second drive chips have stronger universality compared to the first drive chip, so the manufacturing difficulty and cost of the drive group in this example are relatively low.

According to some other embodiments, FIG. 15 is a schematic diagram showing structure of a drive group in some embodiments of the present application. As shown in FIG. 15, each drive group can include a plurality of drive chips 211 set with a physical address in aforementioned examples, physical addresses of a plurality of drive chips 211 in a same drive group are the same, and each drive chip 211 in the drive group is set with an internal address, where different drive chips 211 in the same drive group can have different internal addresses.

At least one controller 10 can be configured to send drive data to a target drive chip 211 according to a physical address of a drive group where the target drive chip 211 is located and an internal address of the target drive chip 211.

In the below, a process of a drive chip acquiring corresponding drive data in this embodiment will be discussed for illustration combining with an example: as shown in FIG. 15, the drive group can include a plurality of first drive chip 211; the physical addresses of the first drive chips 211 are 03, a physical address of the drive group is also 03, each drive chip corresponds to an internal address, such as 01, 02, 03, . . . , n in FIG. 15. At least one controller can send drive data of the drive group, where the drive data of the drive group can include the physical address 03 of the drive group and the internal addresses 01, 02, 03, . . . , and n of the drive chips 211. Each first drive chip 211 can acquire a physical address and a serial address, and acquire data with a physical address and a serial address same with those of itself as drive data of the drive chip. For example, a first drive chip with a serial address 02 number can acquire Data2 carrying an address of 02 number.

In this example, due to uniqueness of each drive chip in the drive unit based on a physical address and an internal address, it is possible to directly send drive data to a corresponding drive chip separately based on the physical addresses and the internal addresses, rather than sending drive data of the entire drive group as shown in the above example. Therefore, this example is relatively more flexible in terms of sending data.

On the basis of this example, respective drive chips can be connected in parallel, or connected in series; and an internal address can be generated in many ways.

As an implementation, a plurality of drive chips in a same drive group can be connected in series, an internal address of a drive chip may be a serial address of the drive chip.

In this implementation, respective drive chips can be connected in series, each drive chip can generate a consecutive serial address based on a software, the drive chip can acquire corresponding drive data based on the serial address.

As another implementation, a plurality of drive chips in a same drive group can be connected in parallel, each drive chip is burned with a burned-in-address, an internal address of the drive chip may be the burned-in-address of the drive chip.

FIG. 16 is a schematic diagram showing structure of a drive group in some embodiments of the present application. As shown in FIG. 16, the drive group can include n first drive chips 211, respective first drive chips 211 can be connected in parallel, each first drive chip 211 is burned with a corresponding burned-in-address, the first drive chip 211 can acquire corresponding drive data according to the burned-in-address.

In this implementation, the internal addresses of drive chips are burned in. Therefore, the drive chips in this implementation can be connected in parallel, i.e. a plurality of drive chips are connected in parallel through one data line, which can further improve the efficiency of data transmission.

The arrangement of respective drive chips in each drive group can include various forms.

According to some embodiments, each drive group may correspond to a row of light beads in a light board, a different drive group may correspond to a different row;

each drive chip in each drive group can be connected to at least one light bead in a row corresponding to the drive group.

It can be understood that in this example, a drive group can be connected to a row of light beads, this row of light beads can include a plurality of partitions (light strings), each partition can include at least one light bead. In some embodiments, to facilitate the connection between a drive chip and a light bead, the drive chip and the corresponding light bead can be installed on a nearby substrate as a backlight strip. Therefore, the arrangement manner of respective drive chips in the drive group is same as that of the corresponding light bead. When a drive group corresponds to a row of light beads, the drive chips in the drive group may be also arranged in rows, as shown in FIG. 12. That is to say, the backlight strip is a horizontal lamp strip.

As an example, FIG. 17A is a schematic diagram showing structure of a light board in some embodiments of the present application. As shown in FIG. 17A, light beads of the light board can be divided, from top to bottom, into a plurality of display groups with a same quantity of rows, drive groups corresponding to respective rows located in a same display group can be divided into a same drive unit. For example, a 1-st row drive group, a 2-nd row drive group, and a 3-rd row drive group corresponding to a 1-st row, a 2-nd row, and a 3-rd row in the display group 31a are divided into one drive unit, i.e. the example shown in FIG. 12.

Figure 17B:
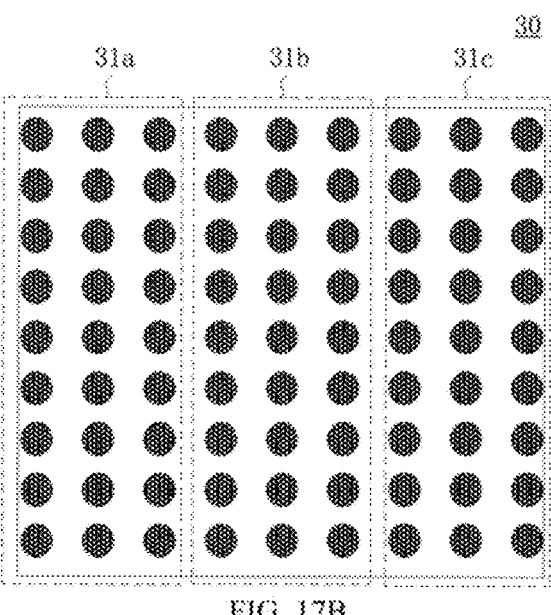
FIG. 17B is a schematic structure diagram of a light board according to some other embodiments.
Figure 18:
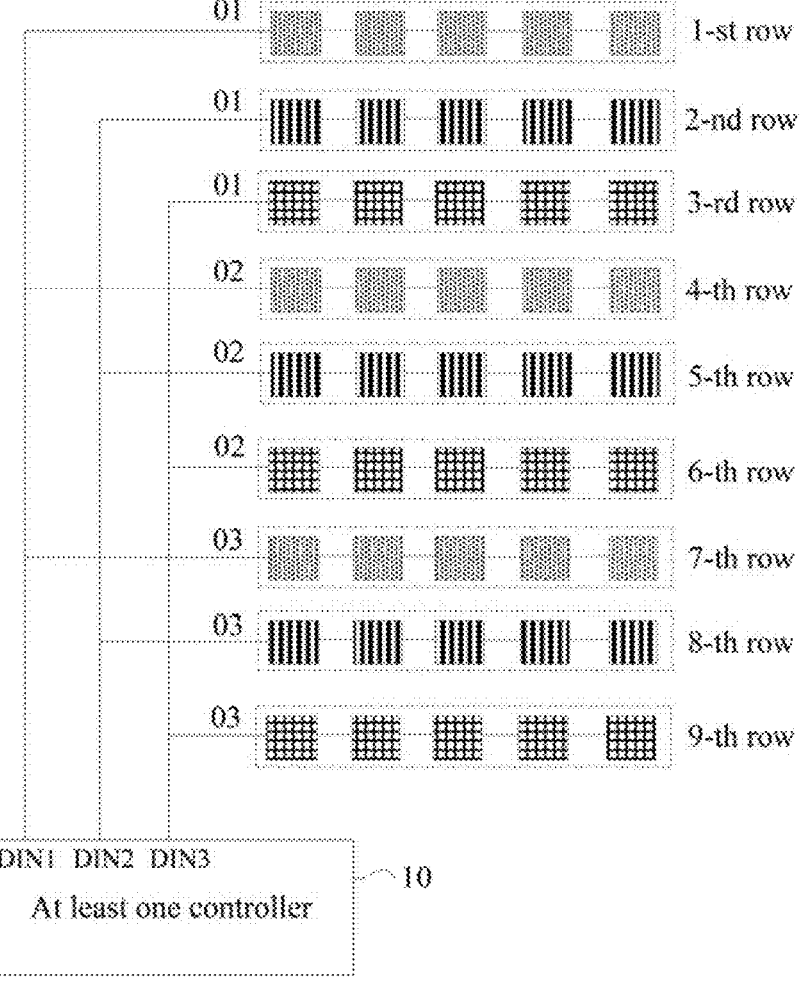
FIG. 18 is a schematic structure diagram of a drive circuit according to some other embodiments.

Further as an example, light beads of the light board can be divided, from top to bottom, into a plurality of display groups with a same quantity of rows, drive groups corresponding to rows with corresponding positions in display groups can be divided into a same drive unit. As shown in FIG. 17A, a 1-st row is a 1-st row of a first display group 31a, a 4-th row is a 1-st row of a second display group 31b, a 7-th row is a 1-st row of a third display group 31c; where the 1-st row, the 4-th row, and the 7-th row are rows with corresponding positions; similarly, a 2-nd row, a 5-th row, and an 8-th row are rows with corresponding positions. FIG. 18 is a schematic diagram showing structure of a drive circuit according to some embodiments of the present application. In FIG. 18, a 1-st row drive group corresponding to a 1-st row (light beads), a 4-th row drive group corresponding to 4-th row (light beads), and a 7-th row drive group corresponding to a 7-th row (light beads) are divided in to one drive unit; similarly, a 2-nd row drive group, a 5-th row drive group, and an 8-th row drive group are divided into one drive unit.

According to some other embodiments, each drive group may correspond to a column of light beads in a light board, a different drive group may correspond to a different column; each drive chip in each drive group can be connected to at least one light bead in a column corresponding to the drive group. That is to say, the backlight strip is a vertical lamp strip.

Similarly, for a column corresponding to each drive group in a same drive unit, there is also no restriction on a position of the column in the light board. As an example, light beads of the light board can be divided, from left to right, into a plurality of display groups with a same quantity of columns, drive groups corresponding to columns with corresponding positions in display groups can be divided into a same drive unit. FIG. 17B is a schematic diagram showing structure of a light board in some embodiments of the present application. As shown in FIG. 17B, starting from a 1-st column, each consecutive three columns are divided into a display group. For example, where the 1-st column, a 4-th column, and a 7-th column are columns with corresponding positions, 2-nd column, a 5-th column, and an 8-th column are columns with corresponding positions. FIG. 19 is a schematic diagram showing structure of a drive circuit according to some embodiments of the present application. As shown in FIG. 19, a 1-st column drive group, a 4-th column drive group, and a 7-th column drive group are divided into one drive unit; a 3-rd column drive group, a 6-th column drive group, and a 9-th column drive group are divided into one drive unit.

Further as an example, light beads of the light board can be divided, from left to right, into a plurality of display groups with a same quantity of columns, drive groups corresponding to respective columns located in a same display group can be divided into a same drive unit.

In addition, the quantity of the drive groups in each drive unit may be the same, and preset marking information of a corresponding drive group in a different drive unit is same. This can facilitate at least one controller to generate drive data for respective drive groups.

The drive circuit according to some embodiments can include a plurality of drive units, preset marking information of a plurality of drive groups in each drive unit is different. In this way, the plurality of drive groups can acquire corresponding drive data through a data line corresponding to a drive unit to which they belongs and based on a corresponding physical address, it is not necessary for each drive group to acquire preset marking information through a separate data line. Therefore, this embodiment can reduce a used quantity of data lines between at least one controller and drive groups, thereby decreasing the manufacturing difficulty and cost of the display apparatus.

According to some other embodiments, the display apparatus can include a drive circuit, a light board, and at least one controller in examples mentioned above.

Based on schematic diagrams of the drive circuit according to embodiments corresponding to FIG. 12, FIG. 18, and FIG. 19, some embodiments of the present application provide a data communication method, the method is for an electronic device, where the electronic device can include at least one controller. FIG. 20 is a schematic flowchart of a data communication method according to some other embodiments of the present application, as shown in FIG. 20, the method can include: S101, generating, for each drive unit, drive data of the drive unit; where the drive data of the drive unit can include drive data of a respective drive group in the drive unit, drive data of each drive group can include a physical address of the drive group; and S102, sending, through the data lines corresponding to the plurality of drive units, to each drive unit, drive data of the drive unit using a parallel transmission manner, so that a respective drive chip in each drive group in the drive unit can acquire, based on preset marking information of the drive group, corresponding drive data from the drive data of the drive unit.

In some embodiments, the preset marking information can include a physical address.

In some embodiments, each drive unit can include a plurality of drive groups, each drive group can include at least one drive chip, each drive chip may correspond to at least one light bead in a light board, a drive chip can be used to drive a corresponding light bead according to drive data. Each drive unit is formed by dividing drive groups with different physical addresses in a drive circuit.

As an implementation, a light board can include a plurality of light beads arranged in an array, with different drive groups corresponding to different rows; the light beads of the light board can be divided, from top to bottom, into a plurality of display groups with a same quantity of rows, drive groups corresponding to respective rows located in a same display group can be divided into a same drive unit.

For example, as shown in FIG. 17A, the light board can include 9 rows of light beads; from top to bottom, each consecutive 3 rows are divided into one display group, the 9 rows of light beads are divided into 3 display groups, such as the 1-st row (light beads), the 2-nd row, and the 3-rd row are as one display group. As shown in FIG. 12, a 1-st row drive group corresponding to the 1-st row, a 2-nd row drive group corresponding to the 2-nd row, and a 3-rd row drive group corresponding to the 3-rd row are divided into the first drive unit 21a. Similarly, a 4-th row drive group, a 5-th row drive group, and a 6-th row drive group are divided into the second drive unit 21b; a 7-th row drive group, an 8-th row drive group, and a 9-th row drive group are divided into the third drive unit 21c.

As another implementation, each drive group may correspond to a row of light beads in a light board, the light board can include a plurality of light beads arranged in an array, a different drive group may correspond to a different row. The light beads of the light board can be divided, from top to bottom, into a plurality of display groups with a same quantity of rows, drive groups corresponding to rows with corresponding positions in display groups can be divided into a same drive unit.

For example, as shown in FIG. 17A, where a 1-st row is a 1-st row in a first display group 31a, a 4-th row is a 1-st row in a second display group 31b, a 7-th row is a 1-st row in a third display group 31c, then the 1-st row, the 4-th row, and the 7-th row are rows with corresponding positions. For another example, a 2-nd row, a 5-th row, and an 8-th row are rows with corresponding positions. In FIG. 18, a 1-st row drive group corresponding to a 1-st row (light beads), a 4-th row drive group corresponding to 4-th row, and a 7-th row drive group corresponding to a 7-th row are divided in to one drive unit; similarly, a 2-nd row drive group, a 5-th row drive group, and an 8-th row drive group are divided into one drive unit.

In the two implementations mentioned above, the quantity of the drive groups in each drive unit is the same. In this way, the quantities of the drive data of drive groups in each drive unit are the same. Therefore, at least one controller can generate drive data for respective drive units based on a same algorithm, thereby reducing process pressure of the at least one controller, and thereby further improving a response speed of backlight of the display apparatus.

In the below, this embodiment will be discussed for illustration by taking the implementation in FIG. 18 as an example: as shown in FIG. 12, a drive circuit can include a first drive unit 21a, a second drive unit 21b, and a third drive unit 21c; each drive unit can include 3 drive groups, preset marking information of respective drive groups in a same drive unit may be different. When preset marking information can include a physical address, physical addresses of three drive groups in the first drive unit 21a can be respectively 01, 02, and 03. At least controller 10 can generate corresponding drive data of 3 drive units. FIG. 21 is a schematic structure diagram of drive data of a drive unit according to some embodiments. As shown in FIG. 21, drive data 40 of each drive unit can include drive data 41 of a plurality of drive groups, where drive data of a drive group can include a physical address. Further referring to FIG. 18, the at least one controller 10 can send drive data of the 3 drive units to corresponding drive groups according to physical addresses carried in the drive data and through 3 data lines, so that a drive chip in a drive group can acquire corresponding drive data. It can be known from the above mentioned, compared to a solution of serializing all drive chips in related arts, that at least one controller sending drive data of 9 drive groups to drive chips corresponding to driving through 3 data lines can quickly transmit drive data to corresponding drive chips, thereby improving response rate of a drive circuit. In addition, compared to a solution of connecting each drive group to at least one controller through a separated data line, this embodiment can reduce a used quantity of data lines between the at least one controller and the drive groups.

In some embodiments, in a liquid crystal display apparatus, screen switching between two consecutive frames can be realized by flipping a liquid crystal unit in each pixel. During a flipping process, a screen will display the change process of the two frames, which will cause image dragging occurred. For this reason, the liquid crystal apparatus may usually use a black frame insertion (abbreviated as BFI) technology, which inserts a black screen between two frames. In this way, the changes in the screen during the flipping process of the liquid crystal will not be presented, but will be displayed in all black. During a specific implementation, black display between two frames can be realized by turning off the backlight. When the liquid crystal unit of a next frame ends flipping, the backlight can be turned on, so that screens of two frames can be directly displayed between the two consecutive frames without displaying the change process, thus avoiding the image dragging. But this requires the response of driving backlight of the display apparatus to be fast enough. Therefore, for the related arts, it is difficult to realize the BFI technology for the solution of serializing all drive chips. In the drive circuit of this embodiment, at least one controller can send data to respective drive chips in the drive unit simultaneously based on a plurality of data lines. Therefore, a response speed of the drive circuit can be improved and the BFI technology can be realized relatively easier. In addition, a display apparatus may usually use a row scanning technology for display, that is to say, light beads used to provide backlight in the display apparatus are enabled or updated row by row, so a delay for validation is required to be set between the drive data of the drive groups corresponding to respective rows of light beads are required. In the below, an embodiment of implementing BFI function of a display apparatus on a basis of row scanning will be discussed for illustration.

According to some embodiments, each drive group may correspond to one liquid crystal unit group, the liquid crystal unit group can include a plurality of liquid crystal units, each liquid crystal unit may correspond to one light bead. FIG. 22 is a schematic flowchart showing another data communication method in some embodiments of the present application, as shown in FIG. 22, S101 can include: S1011, acquiring, for each drive unit, original data of respective drive groups in the drive unit; where the drive data of the drive groups can be generated based on the original data of the drive groups; and S1012, generating drive data of the drive unit based on the original data of the respective drive groups in each drive unit, to obtain drive data of the plurality of drive units.

In this example, a liquid crystal unit can be configured to change a flipping angle under the action of an electric field, control transmission and blocking of backlight, and adjust transmitted light, thereby regulating the brightness and color of pixels. Therefore, there will be a corresponding flipping angle for each frame of image.

In S1011 of this example, original data of a drive group can include drive data of respective drive chips in the drive group, the original data of the drive group is relative to the drive data of the drive group. In some examples, such as in a scenario where a drive chip and at least one controller have clock pins and a delay can be set by a clock function, the original data of the drive group can be directly used as the drive data of the drive group. In other examples, in a scenario where the original data needs to be processed to realize a delay, the processed original data of the drive group needs to be used as the drive data of the drive group (see a following example of achieving a delay based on first invalid data for details).

FIG. 23 is a schematic structure diagram of original data of a drive group according to some embodiments. As shown in FIG. 23, original data of respective drive groups in a drive unit can include a wave head 411, valid data 412, and a wave tail 413, the valid data 412 can be located between the wave head 411 and the wave tail 413. The wave head 411 can carry a physical address and a starting identifier of the drive data, in this way, when the staring identifier is acquired, a drive chip can know that a next bit is the valid data, the valid data is data that is truly used to drive a light bead. A last bit of the wave tail may be set with a validation identifier, so that after drive chips in each drive group obtain the corresponding drive data, it is not valid separately, but valid simultaneously at the validation identifier, thereby achieving simultaneous control of a row of light beads corresponding to the drive group. It should be noted that in some embodiments, in order to improve the response rate of a drive circuit, original data of each drive group is usually set to a same length.

In S1012, between a wave head of original data of each drive group and a wave head of original data of a previous drive group of the drive group in a same drive unit, there exists a first interval duration corresponding to the drive group; between a wave head of drive data of each drive unit and a wave head of drive data of a previous drive unit, there exists a second interval duration corresponding to the drive unit. This can enable the drive data of each drive group to be valid row by row, thereby cooperating with the row scanning of the display device.

The first interval duration may be a difference value between a first predetermined time instant of a liquid crystal unit group corresponding to a current drive group and a first predetermined time instant of a liquid crystal unit group corresponding to its previous drive group, where the current drive group and the previous drive group are in the same drive unit. The second interval duration may be a difference value between a first predetermined time instant of a first liquid crystal unit group and a first predetermined time instant of a second liquid crystal unit group, where the first liquid crystal unit group is a liquid crystal unit group corresponding to a first drive group in a drive unit, and the second liquid crystal unit group is a liquid crystal unit group corresponding to a first drive group in a previous drive unit of the drive unit. A validation time instant of drive data of the drive group can be consistent with a first predetermined time instant of a liquid crystal unit group corresponding to the drive group.

The first predetermined time instant of the liquid crystal unit group may be a time instant located between a corresponding time instant when the liquid crystal unit group reaches a preset ratio (such as half) of a required flipping angle at a current frame and a time instant when the flipping ends. For example, at the current frame, if the liquid crystal unit needs to be flipped from 10° to 20°, the required flipping angle is 10°, and half of the required flipping angle is 5°. If the liquid crystal unit group starts flipping from 10 ms, flipping 5° takes 2 ms, flipping 10° reaches a predetermined flipping angle of 20° and the flipping ends, and a time instant that the flipping ends is 14.5 ms, then the first predetermined time instant is between 12 ms and 14.5 ms.

In this example, due to that a validation time instant of drive data of a drive group is same as a first predetermined time instant of a corresponding liquid crystal unit group, the validation time instant of the drive data is located at a wave tail of the drive data, and drive data of respective drive chips in the drive group is valid at a wave tail of the drive data. In some embodiments, a validation time instant of drive data of a drive group may be same as an enabled time instant of a corresponding light string. It can be understood that a validation time instant of drive data of a drive group should not be later than a time instant when a corresponding liquid crystal unit group ends flipping at a current frame, otherwise the screen cannot be displayed in a timely manner. The closer the validation time instant of the drive data of the drive group is to the time instant when the liquid crystal unit group ends flipping, the lighter the image dragging phenomenon between two frames, while the closer it is, the greater the risk of incomplete display on the screen. In this example, the first predetermined time instant of the liquid crystal unit group is located between a corresponding time instant when the liquid crystal unit group reaches half of a required flipping angle at a current frame and a time instant when the flipping ends. Therefore, this example can decrease the dragging phenomenon between two frames, thereby achieving the BFI function of the display device.

In the below, this example will be discussed combining with an example: FIG. 24 is a schematic diagram of a relationship between a validation time instant of original data of a drive group and a first predetermined time instant of a corresponding liquid crystal unit group according to some embodiments. As shown in FIG. 24, first predetermined time instants of 9 rows of liquid crystal unit groups are $t1$ to $t9$ in sequence. Wave tails (validation points) of drive data of these 9 drive groups can correspond to first predetermined time instants of corresponding liquid crystal unit groups, that is, the drive data of the drive groups are valid at the predetermined time instants of the liquid crystal unit groups. The length of original data of each drive group can be the same, if it is anticipated that drive data of a drive group is valid at a first predetermined time instant of a corresponding liquid crystal unit group, a corresponding delay can be set between wave heads of original data of these 9 drive groups. For example, original data of a 2-nd row drive group can be set with a delay $t2-t1$ relative to a 1-st row, and a first predetermined time instant of a 1-st row liquid crystal unit group is $t1$, which is also a duration corresponding to a length of the original data. In this way, it can realize that the original data of the 2-nd row drive group is valid at a first predetermined time instant $t2$ of a corresponding liquid crystal unit group.

In above implementations, drive circuits with two kinds of structures (FIG. 12 and FIG. 18) are introduced. In the below, this example will be further introduced respectively combining with the drive circuits in the two implementations.

Combining with the implementation in FIG. 18, FIG. 25 is a schematic structure diagram of drive data of a drive unit according to some other embodiments. As shown in FIG. 18 and FIG. 25, the drive circuit can include 3 drive units, a first drive unit can include a 1-st row drive group, a 4-th row drive group, and a 7-th row drive group; a second drive unit can include a 2-nd row drive group, a 5-th row drive group, and an 8-th row drive group; a third drive unit can include a 3-rd row drive group, a 6-th row drive group, and a 9-th row drive group. Taking the first drive unit as an example, in the first drive unit, a first interval duration is set between a wave head of drive data of the 4-th row drive group and a wave head of drive data of a previous drive group (the 1-st drive group) in the same drive unit, the first interval duration is a difference value between a first predetermined time instant $t4$ of a 4-th row liquid crystal unit group and a first predetermined time instant $t1$ of a 1-st row liquid crystal unit group, i.e. $t4-t1$. For a further example, a first interval duration corresponding to the 8-th row drive group is a difference value between a first predetermined time instant $t8$ of an 8-th row liquid crystal unit group and a first predetermined time instant $t5$ of a 5-th row liquid crystal unit group, i.e. $t8-t5$. A second interval duration corresponding to the second drive unit is a difference value between a first predetermined time instant $t2$ of a 2-nd row liquid crystal unit group and a first predetermined time instant $t1$ of a 1-st row liquid crystal unit group, i.e. $t2-t1$.

Combining with the implementation in FIG. 12, FIG. 26 is a schematic structure diagram of drive data of a drive unit according to some further embodiments. As shown in FIG. 12 and FIG. 26, a first drive unit $21a$ can include a 1-st row drive group, a 2-nd row drive group, and a 3-rd row drive group; a second drive unit $21b$ can include a 4-th row drive group, a 5-th row drive group, and a 6-th row drive group; a third drive unit $21c$ can include a 7-th row drive group, an 8-th row drive group, and a 9-th row drive group. A first interval duration corresponding to the 8-th row drive group is $t8-t7$, a first interval duration corresponding to the 6-th row drive group is $t6-t5$; a second interval duration corresponding to the second drive unit is $t4-t1$.

In the above drive circuits with two different kinds of structures, the calculation methods for the first interval duration and the second interval duration are the same, but there is a significant difference in data transmission efficiency between these two implementations. In a second scenario, drive groups corresponding to adjacent rows in the light board can be divided into one drive unit, at least one controller can send drive data of respective drive groups in a drive unit through one data line; that is to say, the drive data of the respective drive groups in the drive unit can be sent in order. In this way, an interval (i.e. $t1$) of transmission duration of one piece of drive data is at least present between two pieces of drive data sent on a same data line. Due to that drive groups in a same drive unit correspond to adjacent rows, the interval duration between drive data of the drive groups in the same drive unit can be shorter. In some cases, a first interval duration corresponding to a drive group is shorter, which is smaller than transmission duration of drive data of the drive group, which makes it impossible to realize the BFI function. However, in a first scenario, drive groups corresponding to adjacent rows in a light board can be divided into different rows, data of the drive groups corresponding to adjacent rows in the light board can be transmitted through different data lines, which is not restricted by the transmission duration of the drive data. However, there are other rows between respective drive groups in a same drive unit, and a first interval duration of a drive group is relatively long, resulting in higher data transmission efficiency and easier implementation of the BFI function.

In this example, by setting corresponding first interval durations for respective drive groups in a same drive unit, and setting a corresponding second interval duration for each drive unit, drive data of a drive group being valid at a first predetermined time instant of a corresponding liquid crystal unit is realized, thereby achieving the BFI function of the display device.

In some embodiments, at least one controller can usually generate drive data of respective drive units based on BMC encoding. In this scenario, at least one controller is required to simultaneously send the drive data of the respective drive units. To realize the above delay, according to some embodiments, S1011 may include: for a first drive group in each drive unit, adding first invalid data before a wave head of original data of the drive group to obtain drive data of the drive group, where a data length of the first invalid data is consistent with a second interval duration corresponding to a drive unit where the drive group is located; for each of other drive groups, adding second invalid data before a wave head of original data of the drive group as drive data of the drive group, where a data length of the second invalid data is consistent with a difference value between a first interval duration of the drive group and a duration corresponding to a data length of original data of the drive group; and for each drive unit, integrating drive data of all drive groups in the drive unit, to obtain drive data of the drive unit, FIG. 27 is a schematic structure diagram of drive data of a drive unit according to some further embodiments. As shown in FIG. 27, first invalid data 42 can be added before a wave head of original data 41 of a first drive group in drive data of the drive unit, second invalid data 44 can be added before wave heads of original data 41 of other drive groups except the first drive group, to generate drive data 43 of drive groups. The drive data of respective drive groups can be integrated to generate drive data of the drive unit.

In this example, a delay of drive data of the drive unit is realized by setting the first invalid data before the first drive group in the drive unit and setting the second invalid data before the other drive groups. Thereby achieving the FBI function of the display device in a scenario where the at least one controller uses BMC encoding.

In some embodiments, for each drive unit, at least one controller may generate drive data of the drive unit, the drive data of each drive unit can include drive data of a plurality of drive groups with different physical addresses. Due to that a physical address carried in drive data of each drive group is different, drive data can be sent through the data lines corresponding to a plurality of drive units, to each drive unit using a parallel transmission manner. The data communication method according to this embodiment can reduce a used quantity of data lines between at least one controller and drive groups, thereby reducing a used quantity of data lines in a drive circuit of a display device.

A data communication method according to some other embodiments can be for a drive chip. A drive circuit corresponding to each drive chip can include a plurality of drive units, each drive unit can include a plurality of drive groups, each drive group can include at least one drive chip, the drive circuit can be connected to at least one controller through a plurality of data lines, the plurality of data lines can correspond one-to-one with the plurality of drive units, each drive unit can be connected to the at least one controller through a corresponding data line. FIG. 28 is a schematic flowchart of a data communication method according to a further embodiment of the present application. As shown in FIG. 28, the method can include: S201, receiving first drive data sent by the at least one controller, and acquiring a physical address of the drive chip; where the first drive data can include a first physical address; S202, if the first physical address is the same as the physical address of the drive chip, extracting drive data of the drive chip from the first drive data; otherwise, no processing is executed; and S203, driving a light bead corresponding to the drive chip based on the drive data of the drive chip.

The first drive data can be generated by the at least one controller according to drive data of respective drive groups in each drive unit and sent through a data line corresponding to a drive unit to which a drive group where the drive chip is located belongs; the first drive data of the drive unit can include drive data of respective drive groups in the drive unit, drive data of each drive group can include a first physical address of the drive group, physical addresses of respective drive groups in a same drive unit are different.

The data communication method according to some embodiments may be run on a drive chip, or may be run on a drive circuit or a display device including a drive chip. This embodiment takes the execution body as a drive chip as an example.

In S201, the first drive data sent by the at least one controller can be received based on a data line connected to a drive unit to which the drive chip belongs. The first drive data may include drive data of all drive chips in a corresponding drive unit. The first drive data can include a first physical address.

As an example, as shown in FIG. 22, the first drive data can include drive data of a plurality of drive groups, drive data of each drive group can include a wave head 411, valid data 412, and a wave tail 413; the valid data 412 can be located between the wave head 411 and the wave tail 413. The wave head 411 can carry a physical address and a starting identifier of drive data, in this way, when the staring identifier is acquired, a drive chip can know that a next bit is valid data, the valid data is data that is truly used to drive a light bead. A last bit of the wave tail can be set with a validation identifier, so that after drive chips in each drive group obtain the corresponding drive data, it is not valid separately, but valid simultaneously at the validation identifier, thereby achieving simultaneous control of a row of light beads corresponding to the drive group.

In some embodiments, physical addresses of drive data of a plurality of drive groups in the first drive data may be different. A drive chip compares its physical address with a physical address of a drive group, if they are the same, it indicates that drive data of the drive group can include drive data of the drive chip, and the drive chip can extract corresponding drive data from the drive data of the drive group and drive a corresponding light bead.

In some embodiments, there are various methods for acquiring a physical address of a drive chip. In an example, S201 can include: acquiring a first voltage at an address pin of the drive chip; and determining, according to physical addresses corresponding to different voltages, a physical address corresponding to the first voltage as the physical address of the drive chip.

The circuit structure for determining the physical address using the first voltage at the address pin has been explained in the corresponding embodiments of FIG. 9A, FIG. 9B, and FIG. 10, and will not be repeated here.

In the below, an embodiment that a drive chip acquiring drive data of the drive chip from the first drive data will be discussed for illustration.

According to some embodiments, drive data of the drive group can include drive data of each drive chip in the drive group, the drive data of each drive chip can include a serial address of the drive chip in a drive group to which the drive chip belongs. In S202, the extracting the drive data of the drive chip from the first drive data can include: acquiring, from drive data of the drive group, drive data with a serial address that is same as the serial address of the drive chip as the drive data of the drive chip.

In this example, respective drive chips in each drive group can be connected in serial, each drive chip can have a serial address generated based on a software. It can be understood that in each drive unit, the physical address of the drive chip may be superimposed with the serial address, which can make the drive chip unique in the drive unit. In this way, serial addresses of drive chips can be carried in respective drive data of the drive group, and the drive chip can acquire the corresponding drive data from the first drive data. The implementation of this embodiment can realize that at least one controller can send data separately to one drive chip in the drive unit. It is also possible to simultaneously send drive data to all drive chips in the drive unit.

According to some other embodiments, respective drive chips in the drive chip can be connected in series; drive data of the drive group can include drive data of all drive chips in the drive group, a sequence of drive data of the respective drive chips in the drive data of the drive group is consistent with a sequence of the corresponding drive chips in the drive chip. In S202, the extracting the drive data of the drive chip from the first drive data can include: extracting the drive data corresponding to the drive chip in order from the drive data of the drive group with a first physical address same as the physical address of the drive chip.

This example provides another embodiment for acquiring drive data of a drive chip, which can be applicable to scenarios where drive data of the drive group can include drive data of all drive chips.

On the basis of the aforementioned examples, according to some embodiments, each group may correspond to a liquid crystal unit group. The driving the light bead corresponding to the drive chip based on the drive data of the drive chip can include: for each frame, generating a first control signal at a current frame according to the drive data of the drive chip; where the first control signal can include a pulse signal segment and a non pulse signal segment, a starting time instant of the pulse signal segment is a first predetermined time instant located between a corresponding time instant when the liquid crystal unit group reaches a preset ratio (such as half) of a flipping angle at the current frame and a time instant when the flipping ends; an ending time instant of the pulse signal segment is a second predetermined time instant located between a time instant when a liquid crystal unit group corresponding to a drive group where the drive chip is located starts flipping at a next frame and a time instant corresponding to a preset ratio (such as half) of a flipping duration; in response to the pulse signal segment, turning off or turning on a light bead corresponding to the drive chip; and in response to the non pulse signal segment, turning off the light bead corresponding to the drive chip.

This example mainly discusses a method for controlling on and off of a corresponding light bead based on a first control signal of a drive chip, FIG. 29 is a schematic structure diagram of a first control signal according to some embodiments. As shown in FIG. 29, the first control signal can include a pulse signal segment and a non pulse signal segment, the pulse signal segment can include a plurality of pulses, the light bead corresponding to the drive chip can be turned off at the non pulse signal segment, the light bead can be turned on or off at the pulse signal segment. A duty cycle of the pulse signal segment and a quantity of pulses can be generated according to the drive data, where the duty cycle of the pulse signal segment can control brightness of the corresponding light bead, that is, PWM dimming, thereby achieving Local dimming of the display device, where the higher the duty cycle, the higher the brightness of the light bead, while the smaller the duty cycle, the lower the brightness of the light bead. However, the cycle of each pulse in the pulse signal segment may be same, and the more pulses there are, the longer the enabled duration of the light bead, then the higher the overall brightness of the display device. Therefore, local dimming and overall dimming of the display device can be realized based on the first control signal.

Although the light bead can turn on or off in response to the pulse signal segment, but with respect to effects in reality, the light bead is in an on-state during the pulse signal segment. In some embodiments, during a liquid crystal flipping process, the shorter the duration the light bead is turned on, the lighter the dragging phenomenon, and the better the BFI effect. Therefore, the starting time instant and the ending time instant of pulse signal affect the display effect of the screen. In this example, the starting time instant of the pulse signal segment is the first predetermined time instant located between a corresponding time instant when the liquid crystal unit group reaches half of a flipping duration at the current frame and a time instant when the flipping ends; the ending time instant of the pulse signal segment is the second predetermined time instant located between a time instant when a liquid crystal unit group corresponding to a drive group where the drive chip is located starts flipping at a next frame and a time instant corresponding to half of the flipping duration.

For example, at the current frame, the liquid crystal unit needs to be flipped from 10° to 20°, the required flipping angle is 10°, and half of the required flipping angle is 5°; if the liquid crystal unit group starts flipping from 10 ms, flipping 5° takes 2 ms, flipping 10° reaches a predetermined flipping angle of 20° and the flipping ends, and a time instant that the flipping ends is 14.5 ms, then the first predetermined time instant is between 12 ms and 14.5 ms. For a next frame, the liquid crystal unit flips from 20° to 14°, the required flipping angle is 6°, and half of the required flipping angle is 3°; if the liquid crystal unit group starts flipping from 28 ms, flipping 3° takes 1 ms, then the second predetermined time instant is between 10 ms and 11 ms.

In this example, the starting time instant of the pulse signal segment of the first control signal is the first predetermined time instant located between a corresponding time instant when the liquid crystal unit group reaches half of a flipping duration at the current frame and a time instant when the flipping ends; the ending time instant of the pulse signal segment is the second predetermined time instant between a time instant when a liquid crystal unit group corresponding to a drive group where the drive chip is located starts flipping at a next frame and a time instant corresponding to half of the flipping duration. In this way, there is a period of time when the light string is turned off during the liquid crystal flipping process, which decreases the dragging phenomenon of the screen and improves the image quality.

In some embodiments, the drive chip compares its physical address with a first physical address of a drive group in the received first drive data to acquire drive data of the drive chip. Based on this embodiment, at least one controller can simultaneously send drive data to a corresponding drive unit through a plurality of data lines, and each data line can also send drive data of a plurality of drive groups with different physical addresses. Compared to a solution of each drive group performing communication through one data line in related arts, this can reduce a used quantity of data lines, thereby reducing a used quantity of data lines in a drive circuit of a display device.

When at least one controller 10 controls a plurality of drive chips in a drive circuit 20, it is also necessary to acquire feedback signals from respective drive chips to regulate a power supply voltage provided by a power supply module 13 to a light board 30. A schematic diagram of a coupling relationship between the at least one controller 10, the drive circuit 20, the power supply module 13, and the light board 30 is shown in FIG. 30.

In FIG. 30, the drive circuit 20 can include a plurality of drive chips, a drive chip can be connected to the at least one controller 10 and at least one light string in the light board 30, the drive chip can be configured to collect a power supply voltage of a light string and generate a feedback signal to the at least one controller; the at least one controller 10 can be connected to the drive circuit 20, the at least one controller 10 can be configured to generate a final feedback signal according to feedback signals of respective drive chips and provide this feedback signal to the power supply module 13; the power supply module 13 can be connected to the light board 30, and regulate, according to the final feedback signal, a power supply voltage VLED provided to each light string in the light board 30.

In order to further simplify the circuit structure and reduce a used quantity of data lines, the present application also provides a regulation method of power supply voltage, a schematic flowchart of the method is shown in FIG. 31. An execution body of the regulation method of power supply voltage according to some embodiments may be a regulation device of power supply voltage, which can integrate a power supply module, at least one controller, and a drive chip; it can also be an electronic device integrated with a regulation device of power supply voltage. This embodiment takes that the execution body is the regulation device of power supply voltage as an example to explain the regulation method of power supply voltage. As shown in FIG. 31, the method can include: S301, obtaining a power supply voltage value of the light string at a predetermined current value; S302, fitting to obtain a current-voltage relationship of the light string according to the predetermined current value and the power supply voltage value of the light string at the predetermined current value; where the current-voltage relationship of the light string represents a current value that flows through the light string when a different power supply voltage value is applied to the light string; and S303, determining, based on the current-voltage relationship, a power supply voltage value corresponding to a target current value, and output a power supply voltage having a voltage value which is the power supply voltage value corresponding to the target current value, to the light string.

In some embodiments, the current-voltage relationship of the light string may be obtained by the power supply voltage value of the light string at the predetermined current. Based on the current-voltage relationship, the power supply circuit can obtain a power supply voltage required for the light string to reach a target current in a current environment, and output the power supply voltage to supply power to the light string in the light board.

In related arts illustrated in FIG. 30, the power supply module can obtain a power supply voltage under a current feedback signal according to the relationship between the feedback signal and the power supply voltage. However, in some embodiments, a power supply voltage at a target current can be directly acquired according to a current-voltage relationship of a light string without regulating a power supply voltage based on the feedback signal. In this way, the power supply circuit does not need to receive a final feedback signal generated by at least one controller, and thus at least one controller does not need to receive a feedback signal from the drive chip either. Therefore, there is no need to connect a data line for outputting signals between the at least one controller and the drive chip, which can reduce the quantity of the data lines of a drive circuit in a display device.

In some embodiments, a power supply voltage of a light string is affected by factors such as a length of a light string's circuit, so even light strings with same specification may have different current-voltage relationships in different display devices. Therefore, in some embodiments, it is necessary to acquire the power supply voltage value of the light string at the predetermined current value based on an actual present connection environment of the light string in advance, and fit the current-voltage relationship of the light string based on the power supply voltage value of the light string at the predetermined current value. Only in this way, the current-voltage relationship of the light string in a current scenario can be accurately acquired. The steps of S301 and S302 can be executed only once during a testing phase before leaving the factory. After obtaining the current-voltage relationship of the light string, S301 and S302 can be omitted in the subsequent use process of the display device. It can be known that, an accuracy of the power supply voltage value of the light string at the predetermined current value directly acquired in S301 can affect an accuracy of the current-voltage relationship. Therefore, the step of acquiring the power supply voltage value of the light string at the predetermined current value is important. In the below, a method of acquiring the power supply voltage value of the light string at the predetermined current value will be discussed for illustration.

Figure 32:
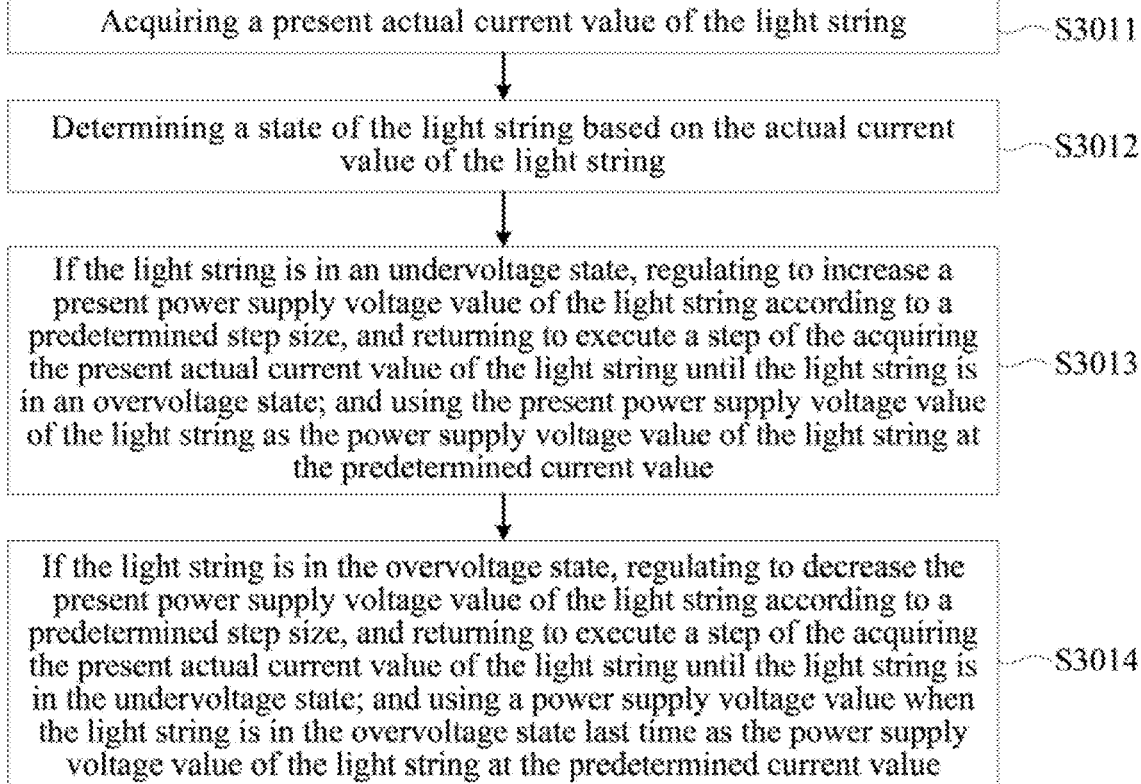
FIG. 32 is a schematic flowchart of another regulation method of power supply voltage according to some embodiments of the present application.

According to some embodiments, FIG. 32 is a schematic flowchart of another regulation method of power supply voltage according to some embodiments of the present application, as shown in FIG. 32, S301 can include: S3011, acquiring a present actual current value of the light string; S3012, determining a state of the light string based on the actual current value of the light string; S3013, based on that the light string is in an undervoltage state, regulating to increase a present power supply voltage value of the light string according to a predetermined step size, and returning to execute a step of the acquiring the present actual current value of the light string until the light string is in an overvoltage state; and using the present power supply voltage value of the light string as the power supply voltage value of the light string at the predetermined current value; and S3014, based on that the light string is in the overvoltage state, regulating to decrease the present power supply voltage value of the light string according to a predetermined step size, and returning to execute a step of the acquiring the present actual current value of the light string until the light string is in the undervoltage state; and using a power supply voltage value when the light string is in the overvoltage state last time as the power supply voltage value of the light string at the predetermined current value.

In this example, step S3011 may be run on a drive chip in the regulation device, where the drive chip can collect an actual current value of a light string connected to it. In some embodiments, the drive chip can obtain the actual current value flowing through the light string by collecting the voltage at both terminals of a sensitive resistor connected in series at a negative terminal of the light string.

In step S3012, a state of the light string can include an undervoltage state and an overvoltage state. When the light string is in the undervoltage state, it indicates that the actual current value flowing through the light string is lower than the predetermined current value. When the light string is in the overvoltage state, it indicates that the actual current value flowing through the light string is not lower than the predetermined current value. For this step, it may be run on at least one controller, that is, at least one controller needs to know a present state of the light string.

It should be noted that the determination of the under-voltage state and the overvoltage state in some embodiments is not limited to the comparison between the actual current value and the predetermined current value. In voltage feedback circuits, it can also be the comparison between the actual voltage value of the light string and the predetermined voltage value. If it is a comparison between voltage values, the actual voltage value can be collected in S3011. If the actual voltage value is less than the predetermined voltage value, it is in the undervoltage state. If the actual voltage value is not less than the predetermined voltage value, it is in the overvoltage state.

In S3013, if at least one controller detects that the light string is in the undervoltage state, it indicates that the power supply voltage of the light string cannot make the current of the light string reach the predetermined current value, and therefore the present power supply voltage needs to be increased. It should be noted that at an initial time instant, an initial voltage is usually set, and subsequent regulations can be made based on the initial voltage. In some embodiments, at least one controller can send a signal representing that the light string is in the undervoltage state to the power supply circuit. When the power supply circuit receives the signal, it can regulate to increase a present drive voltage according to a predetermined step size and return to execute a step of acquiring a present actual current value of the light string until a present state is the overvoltage state, which indicates that the power supply voltage that can make the light string reach the predetermined current is between a voltage in the undervoltage state last time and a voltage in the overvoltage state this time. Therefore, the present power supply voltage value (the power supply voltage under the overvoltage state) can be used as the power supply voltage value at the predetermined current value. It can be understood that the power supply voltage value under the predetermined current value obtained currently is an estimated value, and its accuracy is affected by the predetermined regulating step size. The smaller the regulating step size, the higher the accuracy of the acquired power supply voltage value.

Similarly, in S3014, if at least one controller detects that the light string is in the overvoltage state, it can send a signal of being in the overvoltage state to the power supply circuit. The power supply circuit can regulate to decrease a present voltage according to a predetermined step size and repeat to execute a step of detecting a present state of the light string until detecting that the light string is in the undervoltage state, which indicates that the power supply voltage that can make the light string reach the predetermined current is between a voltage in the overvoltage state last time and a voltage in the undervoltage state this time. Therefore, the present power supply voltage value (the power supply voltage under the undervoltage state) can be used as the power supply voltage value at the predetermined current value.

It should be noted that in some embodiments, when it is detected that a light string changes from the overvoltage state to the undervoltage state, or from the undervoltage state to the overvoltage state, in addition to using the present power supply voltage value as the power supply voltage value at the predetermined current value, a voltage value can also be estimated as the power supply voltage value at the predetermined current value from power supply voltages corresponding to the two states. In addition, in the display device, undervoltage of the light string should be avoided as much as possible. Therefore, when changing from the over-voltage state to the undervoltage state, the power supply voltage value of the latest overvoltage state can be used as the power supply voltage value at the predetermined current value.

Furthermore, it is worth mentioning that at least one controller may correspond to a plurality of light strings. In order to avoid undervoltage of the light strings, it is possible to determine that the present light strings are in the undervoltage state when all the light strings are in the undervoltage state, otherwise they are in the overvoltage state.

In the below, an embodiment will be discussed for illustration combining with a specific example: an initial power supply voltage is set as 3V, a preset current is set as 0.8 A. If the at least one controller detects that the present light string is in the undervoltage state, it can send a first signal to the power supply circuit; the power supply circuit can regulate a present power supply voltage to 3.1V according to a step size that is 0.1V; the at least one controller can acquire again the present actual current value of the light string and determine a present state of the light string; if the present state is still the undervoltage state, the power supply circuit can regulate a present power supply voltage to 3.2V; the at least one controller can detect again the present state of the light string, if the present state is the overvoltage state, then the 3.2V can be used as the power supply voltage value at the predetermined current value of 0.8 A. Similarly, if the at least one controller detects that the present light string is in the overvoltage state, it can send a second signal to the power supply circuit; the power supply circuit can regulate a present power supply voltage to 2.9V; the present state of the light string can be detected again; if the present state is still in the overvoltage state, the power supply circuit can regulate a present power supply voltage to 2.8V; the present state of the light string can be detected again, if the present state is in the undervoltage state, the at least one controller reads the present power supply voltage of 2.8V and the 2.8V can be used as the power supply voltage value at the predetermined current value of 0.8 A.

In this example, based on the actual current value of the light string collected by the at least one controller, the state of the light string can be determined, and the power supply voltage of the light string can be regulated accordingly based on the state of the light string. Then, the state of the light string can be repeatedly determined until the state of the light string changes, and the present power supply voltage can be used as the power supply voltage under the predetermined current.

In the below, embodiments for determining the state of the light string will be discussed for illustration.

According to some embodiments, S3012 can include: comparing the present actual current value of the light string with the predetermined current value, generating a state value based on a comparison result and storing the state value; where when the state value is a first value, it indicates that the actual current value is lower than the predetermined current value; when the state value is a second value, it indicates that the actual current value is greater than the predetermined current value; and determining a present state of the light string based on the state value.

This process may be run on a drive chip in the regulation device. For example, if the actual current value is greater than the predetermined current value, it is in the overvoltage state, the state value is 1; on the contrary, the state value is 0. Further, the present state can be acquired based on the stored state value.

Figure 33:
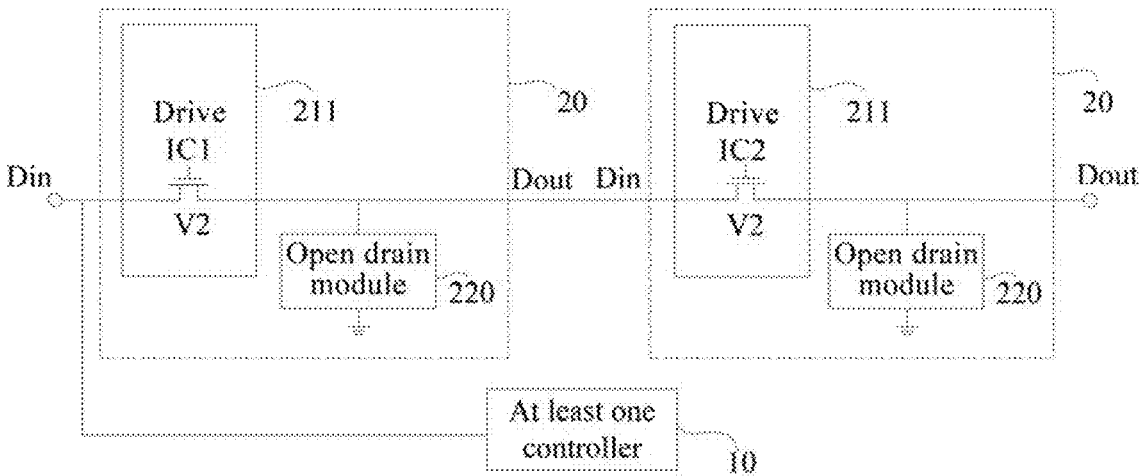
FIG. 33 is a schematic structure diagram of a drive circuit according to some other embodiments.

On the basis of the aforementioned examples, in an implementation, FIG. 33 is a schematic structure diagram of a drive circuit according to some other embodiments. As shown in FIG. 33, the drive circuit can include a plurality of drive chips and a plurality of open drain modules; the plurality of drive chips can correspond one-to-one with the plurality of open drain modules, the plurality of drive chips 211 can be connected in series; each drive chip 211 may correspond to at least one light string, a data input port of a drive chip located in a first position in the plurality of drive chips 211 can be connected to the at least one controller 10; a data input port and/or a data output port of each drive chip 211 can be connected to an output terminal of a corresponding open drain module 220, the open drain module 220 may be grounded. The determining the state of the light string based on the present state value can include: for each drive chip, directly connecting a data input port of the drive chip to a data output port of the drive chip; for each drive chip, if a present state value of a light string corresponding to the drive chip is a first value, controlling the output terminal of the open drain module to output a first level; if the present state value of the light string corresponding to the drive chip is a second value, controlling the output terminal of the open drain module to output a second level; and acquiring an output level of the data input port of the drive chip located in the first position; if the output level is the first level, it can be determined that the light string is in the undervoltage state; if the output level is the second level, it can be determined that the light string is in the overvoltage state; when output terminals of open drain modules corresponding to the plurality of drive chips all output the second levels, the data input port of the drive chip located in the first position can output the second level, otherwise the first level is output.

FIG. 33 is only an exemplary structure. In some embodiments, an open drain module can be integrated inside a drive chip or connected outside the drive chip, without limitation in this example.

Figure 34:
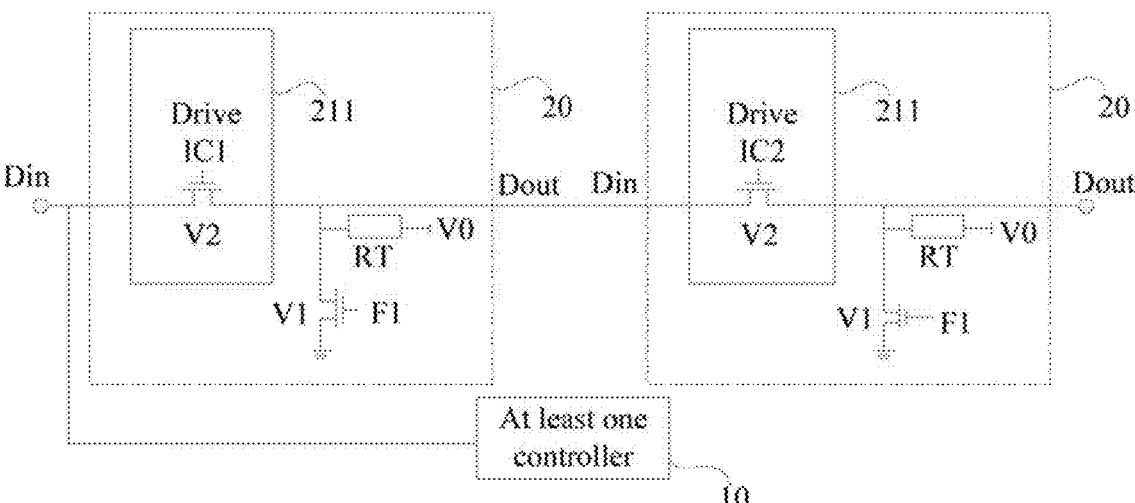
FIG. 34 is a schematic structure diagram of a drive circuit according to some further embodiments.

For an open drain module, as an example, FIG. 34 is a schematic structure diagram of a drive circuit according to some further embodiments. As shown in FIG. 34, an open drain module 220 can include: a first switch unit V1, where a control terminal of the first switch unit V1 can be connected to a drive chip 211, a terminal of the first switch unit V1 can be connected to a data input port and/or a data output port of the drive chip, and another terminal of the first switch unit V1 may be grounded; a first pull-up resistor RT, where a terminal of the first pull-up resistor RT can be connected to a terminal of the first switch unit V1, and another terminal of the first pull-up resistor RT can receive a fixed voltage V0; and the drive chip can be configured to: output a first level to the control terminal of the first switch unit V1 when a state value is a first value, so that the first switch unit V1 is disconnected; and, when the state value is a second value, output a second level to the control terminal of the first switch unit V1, so that the first switch unit V1 is conductive.

It should be noted that during normal operation, at least one controller can send drive data to the drive chip through a data input port Din of a drive chip. When executing S301, at least one controller no longer inputs drive data to the data input port of the drive chip, but detects a voltage of the data input port Din, to determine the present state of the light string.

It should also be noted that in some embodiments, when the drive chip is operating normally, there are a plurality of components connected between the data input port Din and a data output port Dout, which cannot guarantee that a voltage of the data input port Din is equal to a voltage of the data output port Dout. Therefore, in this example, the data input port Din can be directly connected to the data output port Dout. The specific implementation means can refer to FIG. 33 and FIG. 34, that is setting a second switch unit V2 in the drive chip. If S301 is started to be executed, at least one controller can send a read command to the drive chip; the drive chip can control the conduction of the second switch unit V2 to realize a directly connection of the data input port Din with the data output port Dout. After S301 is executed, at least one controller can send a completion command to the drive chip; the drive chip 211 can control a disconnection of the second switch unit V2 to realize the disconnection of the data input port Din and the data output port Dout.

In the below, embodiments will be discussed for illustration using the open drain module being a structure shown in FIG. 34 as an example: as shown in FIG. 34, that the first switch unit V1 is a PMOS transistor and the first level is a low level is taken as an example. At least one controller 10 can send a read command to each drive chip 211; for each drive chip, the second switch unit V2 can be controlled to be conductive, and the data input port Din directly to the data output port Dout can be directly connected. When the state value is the first value (0), the drive chip can output a low level F1 to the corresponding first switch unit V1, and the first switch unit V1 is conductive, an output level of the data input port Din of the drive chip is a low level. When the state value is the second value (1), the drive chip can output a high level F1 to the corresponding first switch unit V1, and the first switch unit V1 is disconnected, an output level of the data input port Din of the drive chip is a high level. It can be understood that only when an output level of each drive chip 211 is a high level, an output level of the data input port Din (a data input port of a drive chip located in a first position) connected to at least one controller 10 is a high level. Otherwise, it is a low level. That is to say, if there is a light string corresponding to a drive chip is undervoltage, it can be determined that it is currently in the undervoltage state. Therefore, when the at least one controller detects that an output level of the data input port Din of the drive chip located in the first position is a high level, it can be determined that a present light string is in the overvoltage state, otherwise it is in the undervoltage state.

In this example, by directly connecting the data input port Din of the drive chip to the data output port Dout, so that output levels of all drive chips connected in series can be known only by acquiring the data input port of the drive chip located in the first position, thereby determining the state of the light strings corresponding to all drive chips.

Figure 35:
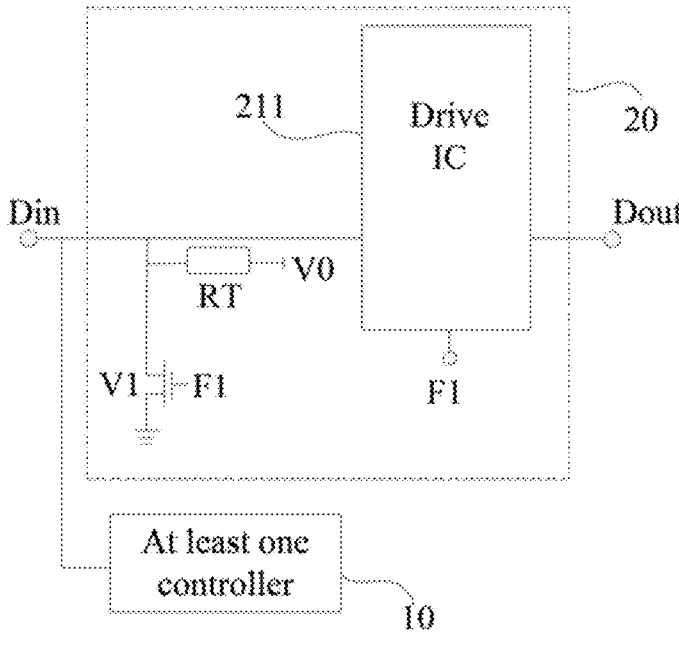
FIG. 35 is a schematic structure diagram of a drive circuit according to some further embodiments.

In another implementation, FIG. 35 is a schematic structure diagram of a drive circuit according to some further embodiments. As shown in FIG. 35, there is one drive chip in the drive circuit, a data input port Din of the drive chip 211 can be connected to at least one controller 10, a terminal of a first switch unit V1, and a terminal of a first pull-up resistor RT; another terminal of the first switch unit V1 may be grounded, a control terminal of the first switch unit V1 can be connected to the drive chip, another terminal of the first pull-up resistor RT can receive a fixed voltage V0. The determining the state of the light string based on the present state value can include: acquiring a present state value; if the present state value is a first value, outputting the first level to the control terminal of the first switch unit; if a present state value is a second value, outputting the second level to the first switch unit; where the first switch unit can be conductive when the control terminal receives the first level, and be disconnected when the control terminal receives the second level; and acquiring an output level of the data input port of the drive chip; if the output level is the first level, it can be determined that the light string is in the undervoltage state; if the output level is the second level, it can be determined that the light string is in the overvoltage state.

In this example, the drive chip can output a corresponding output level based on the state value, so that an output terminal (DIN) of the open drain (OPEN Drain) circuit composed of the first switch unit and the pull-up resistor can output a corresponding level, so that the at least one controller can know the state of the light string currently by detecting a level of the data input port Din of the drive chip, thereby achieving the purpose of acquiring a power supply voltage of the light string at a target current.

In the below, an embodiment of fitting to obtain a current-voltage relationship of the light string in S302 will be discussed for illustration.

According to some embodiments, there are a plurality of predetermined current values; S302 can include: using a curve fitting method to obtain the current-voltage relationship of the light string, based on corresponding different power supply voltage values of the light string at the plurality of predetermined current values.

In this example, based on the embodiments in S301, a plurality of power supply voltages at different predetermined current values can be acquired. In some embodiments, each time the power supply voltage at a predetermined current value can be acquired, a corresponding predetermined current needs to be written into the drive chip. Therefore, the drive chip can be a processing chip such as a micro controller unit (abbreviated as MCU).

In this example, a power supply voltage corresponding to each predetermined current can be regarded as a point, and the more points there are, the more accurate the fitted current-voltage curve will be. Due to that each parameter in this example can be obtained based on actual operating conditions of the light string, the influence of factors, such as environmental factors and connection relationship of the light string itself, on the current-voltage relationship of the light string is considered. Therefore, based on this embodiment, the current-voltage relationship of the light string can be accurately obtained.

According to some other embodiments, S302 can include: fitting to determine a parameter in a reference voltage-current formula of the light string according to a power supply voltage value of the light string at the predetermined current value; acquiring the reference voltage-current formula of the light string based on the parameter in the reference voltage-current formula of the light string; and acquiring a line loss voltage of the light string, and modifying the reference voltage-current formula of the light string based on the line loss voltage of the light string, to determine the current-voltage relationship of the light string.

In this embodiment, an existing reference voltage-current calculation formula of a light string with an unknown parameter is used, and the parameter in the formula can be acquired based on the acquired power supply voltage under the target current mentioned above, so as to acquire the reference voltage-current formula of the light string.

For example, the reference voltage-current formula can be: $U'=U1+a\ln(I1/I)$, where U is a reference power supply voltage at a target current I, I1 is an initial current set at beginning, U1 is a power supply voltage at the initial current I1, and $\alpha$ is a parameter to be determined. Based on the method of S301, the power supply voltage at the predetermined current can be acquired. By substituting current and voltage into the above formula, the corresponding parameter a can be obtained.

In some embodiments, a line loss voltage of a circuit where the light string is located affects a power supply voltage of the light string. And a relationship between the line loss voltage of the circuit and the current is linear; the greater the current, the greater the line loss voltage. Therefore, the line loss voltage of the light string can be obtained in advance at a certain current, thereby obtaining the line loss voltage of the light string, $\Delta U1=k1I$.

Based on the line loss voltage and the reference current-voltage calculation formula, it can be obtained that the power supply voltage at the target current is $U=U'+\Delta U1=U1+a\ln(I1/I)+k1I$. Therefore, the current-voltage relationship of the light string can be determined. Then, based on the formula, the power supply voltage of the target current can be obtained directly.

In this embodiment, an existing reference voltage-current calculation formula of a light string with an unknown parameter is used, and the reference voltage-current formula of the light string can be acquired based on the acquired power supply voltage under the target current mentioned above. The reference voltage-current formula of the light string can be modified based on the line loss voltage of the light string, to acquire the current-voltage relationship of the light string. Thereby the determination of the current-voltage relationship of the light string can be realized based on a small quantity of the power supply voltage value of the light string at the predetermined current value.

In some embodiments, a current-voltage relationship of the light string can be fit to be obtained according to the predetermined current value and the power supply voltage value of the light string at the predetermined current value; and based on the current-voltage relationship, a power supply voltage value corresponding to a target current value can be determined. In this embodiment, a power supply voltage at a target current can be directly acquired according to a current-voltage relationship of a light string without regulating a power supply voltage based on the feedback signal.

In this way, the at least one controller does not need to receive a feedback signal from the drive chip. Therefore, there is no need to connect a data line for transmitting a feedback signal between the at least one controller and the drive chip, which can reduce the quantity of the data lines between the at least one controller and a drive chip.

Figure 36:
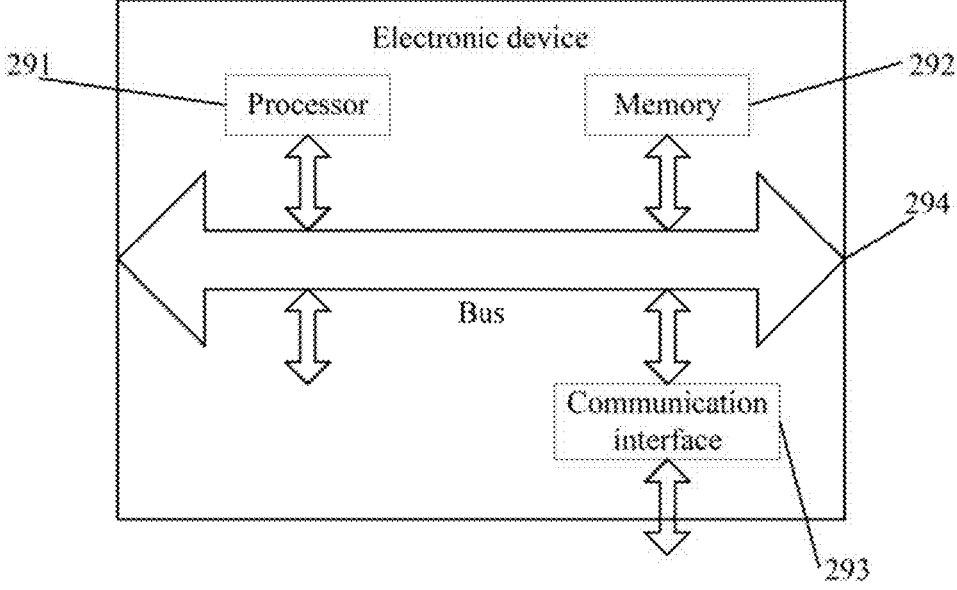
FIG. 36 is a schematic structure diagram of an electronic device according to some embodiments of the present application.

FIG. 36 is a schematic structure diagram of an electronic device according to some embodiments of the present application, as shown in FIG. 36, the electronic device can include the following.

A processor 291, where the electronic device can further include a memory 292; the electronic device can further include a communication interface 293 and a bus 294. The processor 291, the memory 292, and the communication interface 293 can have communication with each other through the bus 294. The communication interface 293 can be used for information transmission. The processor 291 can call logical instructions in the memory 292 to execute the methods described in the above embodiments.

In addition, the logical instructions in the above memory 292 may be implemented in a form of software function unit, and stored in a computer readable storage medium when being sold or used as an independent product.

It should be understood that the present application is not limited to the precise structure described above and shown in the drawings, and various modifications and changes can be made without departing from its scope. The scope of the present application is limited only by the accompanying claims.

What is claimed is:

1. A drive chip applied in a drive circuit for providing backlight, wherein the drive chip has one piece of preset marking information;

the drive chip is electrically connected to at least one controller, and the at least one controller is configured to send drive data to the drive chip based on the preset marking information of the drive chip; and the drive chip is electrically connected to at least one light bead and is configured to drive the at least one light bead according to the drive data, wherein the drive circuit comprises a plurality of drive units and a plurality of data lines, each drive unit comprises a plurality of drive groups connected in parallel, each drive group comprises a plurality of drive chips connected in series, and the drive chip is one drive chip in the plurality of drive chips;

each drive group has one piece of preset marking information, the preset marking information of the drive chip is preset marking information of a drive group where the drive chip is located, and different drive groups in a same drive unit have different preset marking information; and the plurality of drive units correspond one-to-one with the plurality of data lines, and each drive unit is connected to the at least one controller through a corresponding data line.

2. The drive chip according to claim 1, wherein the preset marking information of the drive chip comprises an address of the drive chip, the drive chip is arranged with an address pin, and the address pin is configured to set a physical address of the drive chip; and the at least one controller is further configured to send the drive data to the drive chip based on the address of the drive chip, and the address of the drive chip comprises the physical address of the drive chip.

3. The drive chip according to claim 2, wherein the drive chip comprises:

a plurality of functional pins, wherein each functional pin corresponds to a physical address, and physical addresses corresponding to different functional pins are different; and wherein the address pin is connected to a functional pin; and the physical address of the drive chip is a physical address corresponding to the functional pin.

4. The drive chip according to claim 2, wherein the drive chip comprises:

a sampling resistor, wherein a terminal of the sampling resistor receives a fixed voltage, and another terminal of the sampling resistor is connected to the address pin; and different resistance values of the sampling resistor correspond to different physical addresses; and a fixed resistor, wherein a terminal of the fixed resistor is connected to the another terminal of the sampling resistor, and another terminal of the fixed resistor is grounded.

5. The drive chip according to claim 1, wherein the preset marking information of the drive chip comprises an address of the drive chip, and the drive chip comprises:

an address marking circuit, wherein a control terminal and a first terminal of the address marking circuit are connected to the at least one controller and a second terminal of the address marking circuit is connected to an input pin of the drive chip; and the address marking circuit is configured to: receive address data from the control terminal of the address marking circuit, and when the address data comprises the address of the drive chip that is electrically connected to the address marking circuit, transmit drive data obtained by the first terminal of the address marking circuit to the drive chip.

6. The drive chip according to claim 5, wherein the address marking circuit comprises at least one switch device, and the at least one switch device is connected in series;

the address data comprises at least one address bit set according to an arrangement order of the at least one switch device; and a switch device of the at least one switch is configured to receive the drive data from a first terminal of the switch device, receive a corresponding address bit from a control terminal of the switch device, and output the drive data from a second terminal of the switch device when the switch device is on for conduction.

7. A drive circuit for providing backlight, comprising: a plurality of drive units and a plurality of data lines, wherein each drive unit comprises a plurality of drive groups, each drive group comprises a plurality of drive chips, and the plurality of drive chips comprise at least one first drive chip;

each drive group has one piece of preset marking information, the at least one first drive chip has one piece of preset marking information, the preset marking information of the at least one first drive chip in a drive group is preset marking information of the drive group; and different drive groups in a same drive unit have different preset marking information;

the plurality of drive units correspond one-to-one with the plurality of data lines, and each drive unit is connected to at least one controller through a corresponding data line; and the at least one controller is configured to send drive data to the drive group based on preset marking information of a drive group where a target drive chip is located, so that the target drive chip acquires corresponding drive data; and each drive chip of the drive group is connected to at least one light bead in a light board, the target drive chip is configured to drive the at least one light bead according to the drive data; and the light board comprises a plurality of light beads arranged in an array;

wherein the plurality of drive chips in each drive group are connected in series, and the plurality of drive groups in each drive unit are connected in parallel.

8. The drive circuit according to claim 7, wherein each drive group comprises a plurality of first drive chips;

the plurality of the first drive chips in a same drive group have same preset marking information, each drive chip in the drive group is set with an internal address, and different drive chips in the same drive group have different internal addresses; and the at least one controller is configured to send drive data to a target drive chip according to preset marking information of a drive group where the target drive chip is located and an internal address of the target drive chip.

9. The drive circuit according to claim 8, wherein the internal address of the drive chip is a serial address of the drive chip.

10. The drive circuit according to claim 7, wherein each drive group corresponds to a row of light beads in the light board, and a different drive group corresponds to a different row; and each drive chip in each drive group is connected to at least one light bead in a row corresponding to the drive group.

11. The drive circuit according to claim 7, wherein each drive group corresponds to a column of light beads in the light board, and a different drive group corresponds to a different column; and each drive chip in each drive group is connected to at least one light bead in a column corresponding to the drive group.

12. The drive circuit according to claim 7, wherein a quantity of the drive groups in each drive unit is same, and preset marking information of a corresponding drive group in a different drive unit is same.

13. The drive circuit according to claim 7, wherein each drive chip is connected to at least one light string in the light board, and each light string comprises at least one light bead connected in series; and wherein the at least one controller is further configured to:

acquire a power supply voltage value of a respective light string at a predetermined current value;

obtain a current-voltage relationship of the light string according to the predetermined current value and the power supply voltage value of the light string at the predetermined current value; wherein the current-voltage relationship of the light string represents a current value that flows through the light string when a different power supply voltage value is applied to the light string; and determine, based on the current-voltage relationship, a power supply voltage value corresponding to a target current value, and output a power supply voltage having a voltage value which is the power supply voltage value corresponding to the target current value, to the light string.

14. The drive circuit according to claim 13, wherein the at least one controller is further configured to:

acquire a present actual current value of the light string; wherein the actual current value is collected by a drive chip;

determine a state of the light string based on the actual current value of the light string; wherein the state of the light string comprises an undervoltage state and an overvoltage state; the undervoltage state of the light string indicating that the actual current value flowing through the light string is lower than the predetermined current value; and the overvoltage state of the light string indicating that the actual current value flowing through the light string is not lower than the predetermined current value;

based on that the light string is in the undervoltage state, regulate to increase a present power supply voltage value of the light string according to a predetermined step size, and return to execute a step of the acquiring of the present actual current value of the light string until the light string is in the overvoltage state; and use the present power supply voltage value of the light string as a power supply voltage value of the light string at the predetermined current value; and based on that the light string is in the overvoltage state, regulate to decrease the present power supply voltage value of the light string according to a predetermined step size, and return to execute a step of the acquiring of the present actual current value of the light string until the light string is in the undervoltage state; and use a power supply voltage value when the light string is in the overvoltage state last time as a power supply voltage value of the light string at the predetermined current value.

15. The drive circuit according to claim 14, wherein the at least one controller is further configured to:

compare the present actual current value of the light string with the predetermined current value, and generate a state value based on a comparison result and store the state value; wherein the state value being a first value indicates that the actual current value is lower than the predetermined current value; and the state value being a second value indicates that the actual current value is greater than the predetermined current value; and determine a present state of the light string based on the state value.

16. The drive circuit according to claim 14, wherein each drive chip corresponds to at least one light string, a data input port of a first drive chip located in a first position in the plurality of drive chips is connected to the at least one controller; at least one of a data input port or a data output port of each drive chip is connected to an output terminal of an open drain module, and the open drain module is grounded; and wherein the at least one controller is further configured to:

for each drive chip, directly connect a data input port of the drive chip to a data output port of the drive chip;

for each drive chip, based on that a present state value of a light string corresponding to the drive chip is a first value, control the output terminal of the open drain module to output a first level; and based on that the present state value of the light string corresponding to the drive chip is a second value, control the output terminal of the open drain module to output a second level; and acquire an output level of the data input port of the first drive chip located in the first position; wherein based on that the output level is the first level, the light string is determined to be in the undervoltage state; based on that the output level is the second level, the light string is determined to be in the overvoltage state; and when output terminals of open drain modules corresponding to the plurality of driving chips all output the second levels, the data input port of the first drive chip located in the first position outputs the second level, otherwise, the first level is output.

17. The drive circuit according to claim 13, wherein there are a plurality of predetermined current values; and the at least one controller is further configured to:

use a curve fitting method to obtain the current-voltage relationship of the light string, based on corresponding different power supply voltage values of the light string at the plurality of predetermined current values.

18. The drive circuit according to claim 13, wherein the at least one controller is further configured to:

determine a parameter in a reference voltage-current formula of the light string according to the power supply voltage value of the light string at the predetermined current value;

acquire the reference voltage-current formula of the light string based on a parameter in a voltage formula of the light string; and acquire a line loss voltage of the light string, and modify the reference voltage-current formula of the light string based on the line loss voltage of the light string, to determine the current-voltage relationship of the light string.

19. A display apparatus, comprising a drive circuit for providing backlight, a light board, and at least one controller;

wherein the drive circuit comprises: a plurality of drive units and a plurality of data lines, wherein each drive unit comprises a plurality of drive groups, each drive group comprises a plurality of drive chips, and the plurality of drive chips comprise at least one first drive chip;

each drive group has one piece of preset marking information, the at least one first drive chip has one piece of preset marking information, and the preset marking information of the at least one first drive chip in a drive group is preset marking information of the drive group; and different drive groups in a same drive unit have different preset marking information;

the plurality of drive units correspond one-to-one with the plurality of data lines, and each drive unit is connected to the at least one controller through a corresponding data line;

and the at least one controller is configured to send drive data to the drive group based on preset marking information of a drive group where a target drive chip is located, so that the target drive chip acquires corresponding drive data; and each drive chip of the drive group is connected to at least one light bead in the light board, the target drive chip is configured to drive the at least one light bead according to the drive data; and the light board comprises a plurality of light beads arranged in an array;

wherein the plurality of drive chips in each drive group are connected in series, and the plurality of drive groups in each drive unit are connected in parallel.

* * * * *